United States Patent
Arima et al.

(10) Patent No.: US 6,692,097 B2
(45) Date of Patent: Feb. 17, 2004

(54) PRINTER, IMAGE DATA SUPPLYING APPARATUS AND PRINTING SYSTEM

(75) Inventors: Kazunori Arima, Kanagawa (JP); Toshiya Kondoh, Kanagawa (JP); Hiroyuki Horii, Kanagawa (JP); Koji Kawamura, Kanagawa (JP); Kenichi Inadomi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/949,841

(22) Filed: Sep. 12, 2001

(65) Prior Publication Data

US 2002/0036664 A1 Mar. 28, 2002

(30) Foreign Application Priority Data

Sep. 12, 2000 (JP) ......................... 2000-276579

(51) Int. Cl.⁷ .......................... B41J 2/205; B41J 29/393
(52) U.S. Cl. ............................................. 347/15; 347/19
(58) Field of Search ............................. 347/41, 43, 15, 347/37, 16, 19

(56) References Cited

U.S. PATENT DOCUMENTS

| | | | |
|---|---|---|---|
| 4,272,204 A | 6/1981 | Quinn, Jr. et al. | 400/342 |
| 6,375,307 B1 * | 4/2002 | Vinals et al. | 347/41 |
| 6,409,305 B1 * | 6/2002 | Elgee et al. | 347/35 |

FOREIGN PATENT DOCUMENTS

| | | |
|---|---|---|
| EP | 0 848 540 | 6/1998 |
| EP | 0 992 347 | 4/2000 |
| EP | 1 024 010 | 8/2000 |
| GB | 2 362 608 | 11/2001 |
| JP | 8-336961 | 12/1996 |

* cited by examiner

Primary Examiner—Thinh Nguyen
(74) Attorney, Agent, or Firm—Fitzpatrick, Cella, Harper & Scinto

(57) ABSTRACT

In an ink jet printer, ink ejection beyond the printing medium is reduced when performing printing without leaving a space along at least one of the edges of the printing medium. For this purpose, performance of data processing in the process of image processing relating to the image data of the marginless edge portion reduces a printing density of the area to lessen an ink application amount to the edge portion. For example, data processing is performed in such manner that a predetermined coefficient smaller than 1 is multiplied by the image data of the area.

33 Claims, 20 Drawing Sheets

PRINTER, IMAGE DATA SUPPLYING APPARATUS AND PRINTING SYSTEM

This application is based on Japanese Patent Application No. 2000-276579 filed on Sep. 12, 2000, the content of which is incorporated hereinto by reference.

BACKGROUND OF THE INVENTION

1. Field of the Invention

The present invention relates to a printer, and particularly to an ink jet type printer. The present invention also relates to an image supplying apparatus for supplying image data to the printer, and a printing system such as a copying machine, a facsimile machine, a word processor and a digital camera, each of which is integral with or separate from a printer.

2. Description of the Related Art

An ink jet printing method is advantageous in that actuating noise is sufficiently low to the extent that can be ignored, and in being capable of high-speed recording, and thus is currently becoming preferred among recent printing methods. In such a printing method, there is an ink jet printing head which uses thermal energy on ink to cause ink ejection from ejection openings to perform printing. In an ink jet printing head, the ejection openings can be arranged with high density and colorizing can be easily achieved, resulting in a printer capable of printing an excellent high-resolution image achieved in high-speed. Therefore, a printer using such an ink jet printing head is employed widely as an image output terminal for many devices, such as copying machines, facsimile machines, word processors, computer systems and digital cameras.

As applications of such ink jet printer expand, various kinds of image forming modes to the printing medium are required, for instance, an image forming mode in which a full page printing is made without margin along the edge of the printing medium is also one of the examples.

In the conventional ink jet printers, when performing full page printing on the printing medium, there may be an ejection of inks beyond the printing medium due to the relative unevenness of scanning (main scanning and sub scanning) between the printing head and the printing medium, or an error regarding the size of the printing medium. In such circumstances, some of the conventional printers employ absorption materials, for example pads, for absorbing inks ejected beyond the printing medium, thereby preventing a soilure of an interior of the printer caused by inks. However, in order to make the absorbable amount sufficiently large, the capacity of the interior of the printer has to be made large enough for the absorbing materials, resulting in a problem making the printer a compact size. This problem is particularly acute when the printer is incorporated into equipment such as a digital camera.

It is strongly needed to prevent printing beyond the printing medium not only in view of filling the demand for compact sizing but also in view of reducing a loss of inks (printing agent) as one of the resources for the printers.

SUMMARY OF THE INVENTION

The present invention is made considering the above.

In a first aspect of the present invention, there is provided a printer for forming an image by using printing means for applying printing agent to a printing medium, the printer comprising:

judging means for judging whether a printing to an edge portion of the printing medium is performed; and reducing means for reducing an amount of the printing agent to be applied to the edge portion when the judgement is affirmative.

In a second aspect of the present invention, there is provided a container for storing printing media to be fed to a printer, the container comprising means for indicating the information relating to size of the printing medium being stored therein, and wherein the printer having:

means for judging whether a printing to an edge portion of a printing medium is performed on the basis of the indicated information relating to the size of the printing medium and the information of an image forming mode appointed to the printing medium to be printed; and means for reducing an amount of the printing agent to be applied to the edge portion when the judgement is affirmative.

In a third aspect of the present invention, there is provided an image data supplying apparatus for supplying an image data to a printer which forms an image by using printing means for applying a printing agent to a printing medium, the apparatus comprising:

judging means for judging whether a printing to an edge portion of the printing medium is performed; and reducing means for reducing an amount of the printing agent to be applied to the edge portion when the judgement is affirmative.

In a fourth aspect of the present invention, there is provided a printing system comprising:

a printer for forming an image by using printing means for applying printing agent to a printing medium; and an image data supplying apparatus for supplying an image data to the printer, the apparatus having:

judging means for judging whether a printing to an edge portion of the printing medium is performed; and reducing means for reducing an amount of the printing agent to be applied to the edge portion when the judgement is affirmative.

In a fifth aspect of the present invention, there is provided an image data supplying method for supplying an image data to a printer which forms an image by using printing means for applying a printing agent to a printing medium, the method comprising the steps of:

judging whether a printing to an edge portion of the printing medium is performed; and reducing an amount of the printing agent to be applied to the edge portion when the judgement is affirmative.

With the above stated structure, the amount of printing agent such as inks applied to the edge portion of the printing medium is reduced, thereby achieving a reduction of the application amount (ink overflow amount and the like) of the printing agent ejected beyond the printing medium.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the printing apparatus according to the present invention will be described by referring to the accompanying drawings.

In the present specification, "printing" (also referred to as "recording" in some occasions) means not only a condition of forming significant information such as characters and drawings, but also a condition of forming images, designs, patterns and the like on printing medium or a condition of processing the printing mediums, regardless of the significance or lack of meaning of the image or of being actualized so as to be visually perceived.

Also, a "printer" and a "recording apparatus" mean not only one complete apparatus for carrying out a printing but also an apparatus having a function for printing.

Further, "printing medium" means not only a paper used in a conventional printing apparatus but also other materials capable of accepting inks, such as fabrics, plastic films, metal plates, glasses, ceramics, wood and leathers, and in the following, will be also represented by a "sheet" or simply by "paper".

Further, in the present specification, a "camera" indicates an apparatus or device that optically photographs an image and converts the photographed image into electrical signals, and in the following explanation, is also referred to as a "photographing section".

Still further, an "ink" (also referred to as "liquid" in some occasions) should be interpreted in a broad sense as well as a definition of the above "printing" and thus the ink, by being applied on the printing mediums, shall mean a liquid to be used for forming images, designs, patterns and the like, processing the printing medium or processing inks (for example, coagulation or encapsulation of coloring materials in the inks to be applied to the printing mediums).

Meantime, one embodiment of a head to which the present invention is advantageously employed is the embodiment in which a thermal energy generated by an electrothermal transducer is utilized to cause a film boiling to the liquid resulting in a formation of bubbles.

[Basic Structure]

First, a basic structure of a device according to the present invention will be explained with reference to FIGS. 1 to 14. The device explained in the present embodiment is constituted as information processing equipment comprising a photographing section for optically photographing an image and then converting the photographed image into an electric signal (hereinafter, also referred to as "camera section") and an image recording section for recording an image on the basis of thus obtained electric signals (hereinafter, also referred to as "printer section"). Hereinafter, the information processing equipment in the present embodiment is referred to as a "printer-built-in camera".

Figure 5:
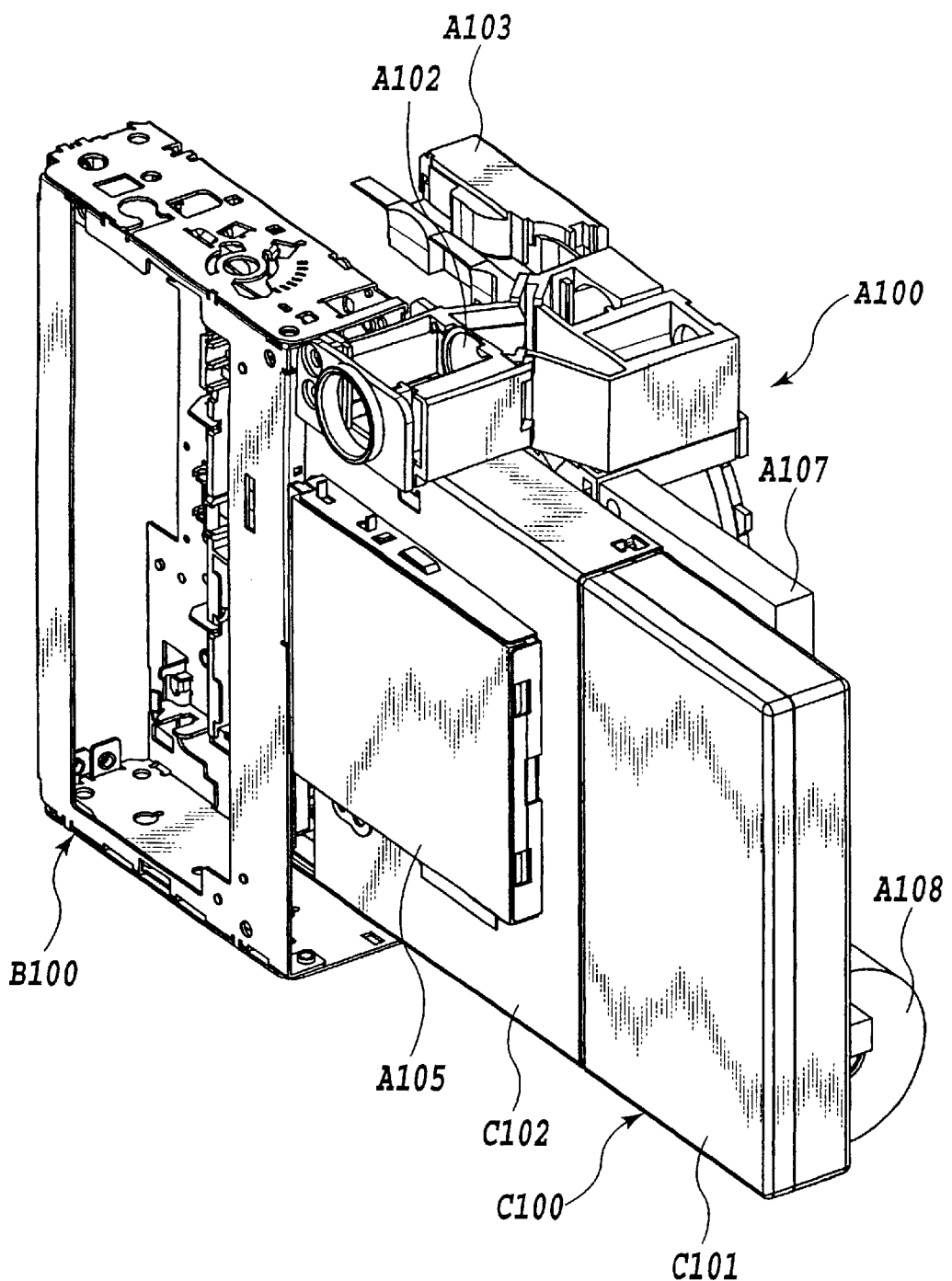
FIG. 5 is a perspective view showing an arrangement of the main components within the camera in FIG. 1.

In a main body A001, there is incorporated a printer section (recording apparatus section) B100 at the backside of a camera section A100 in an integral manner. The printer section B100 records an image by using inks and printing mediums which are supplied from a medium pack C100. In the present structure, as apparent from FIG. 5 illustrating the main body A001 viewing from the backside with an outer package removed, the medium pack C100 is inserted at the right hand of the main body A001 in FIG. 5 and the printer section B100 is arranged at the left hand of the main body A001 in FIG. 5. In the case of performing a recording by the printer section B100, the main body A001 can be placed facing a liquid crystal display section A105 up and a lens A101 down. In this recording position, a recording head B120 of the printer section B100, which will be described below, is made to be positioned to eject inks in the downward direction. The recording position can be made to be the same position as that of photographing condition by the camera section A100 and thus is not limited to the recording position as mentioned above. However, in view of a stability of a recording operation, the recording position capable of ejecting the inks in the downward direction is preferred.

There follows the explanations of the basic mechanical structure according to the present embodiment under the headings of 1 as "Camera Section", 2 as "Medium Pack" and 3 as "Printer Section", and of the basic structure of the signal processing under the heading of 4 as "Signal Processing".

1: Camera Section

Figure 1:
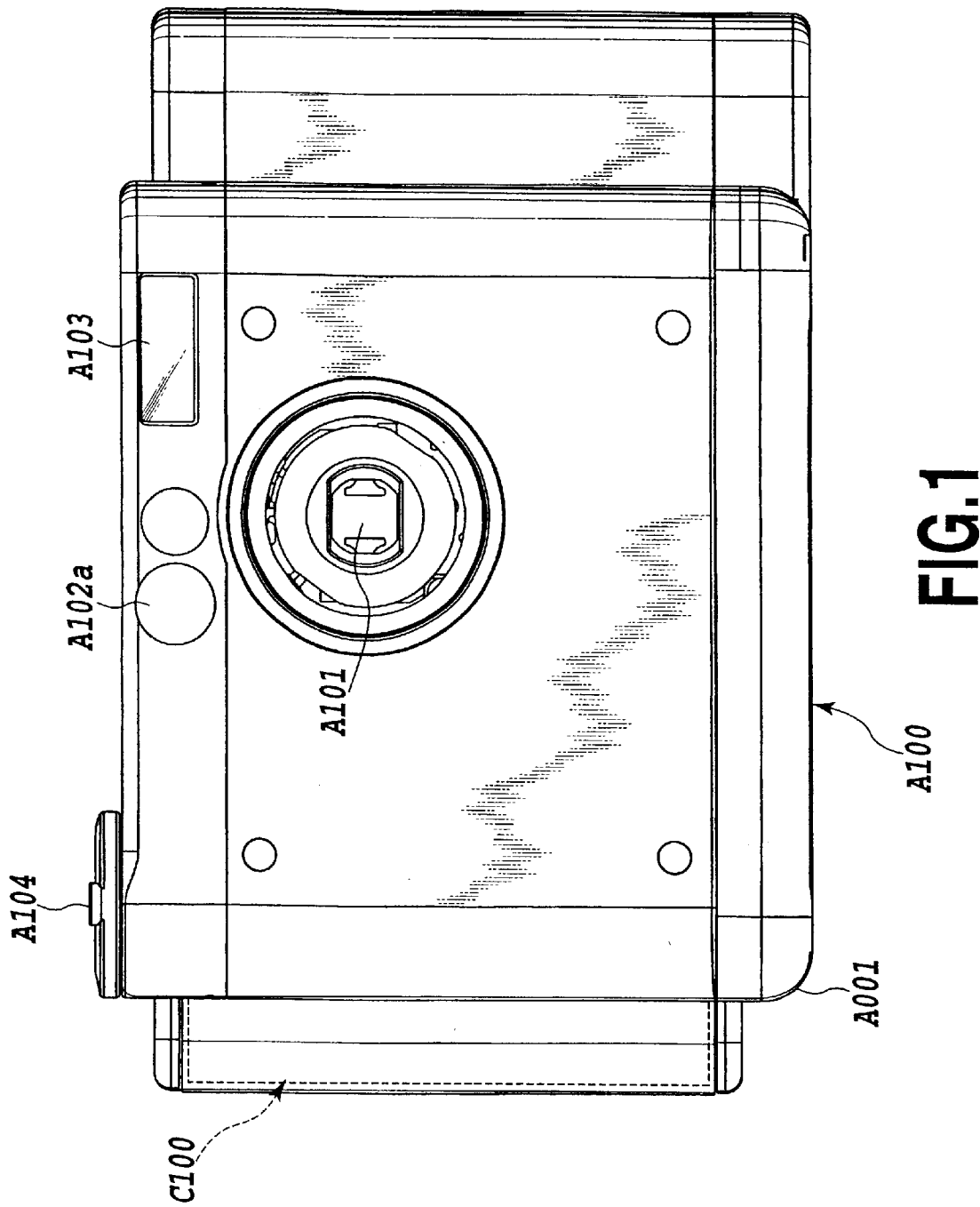
FIG. 1 is a front elevation view of a printer-built-in camera to which the present invention is applicable.
Figure 2:
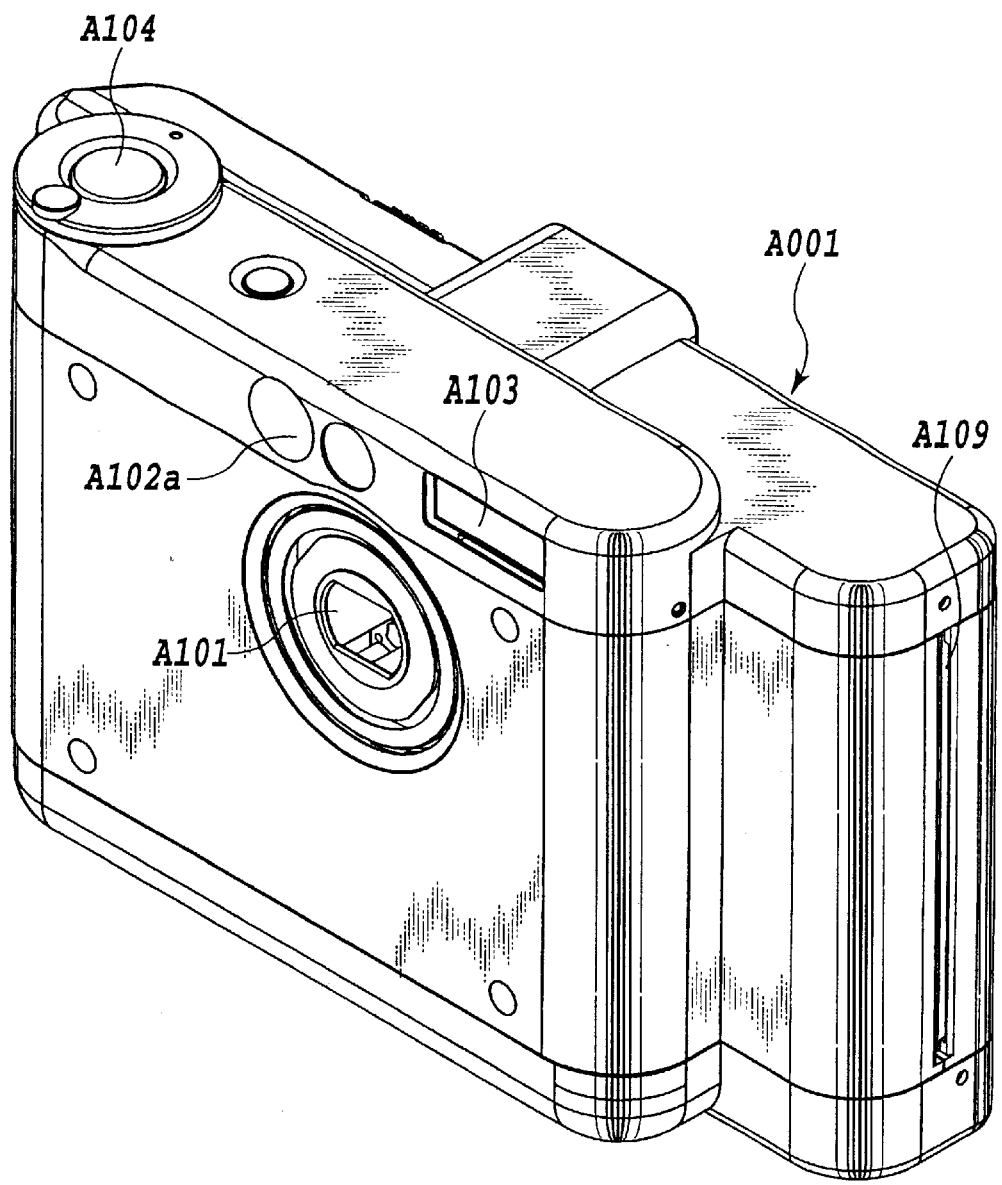
FIG. 2 is a perspective view of the camera in FIG. 1 viewing diagonally from the front thereof.
Figure 3:
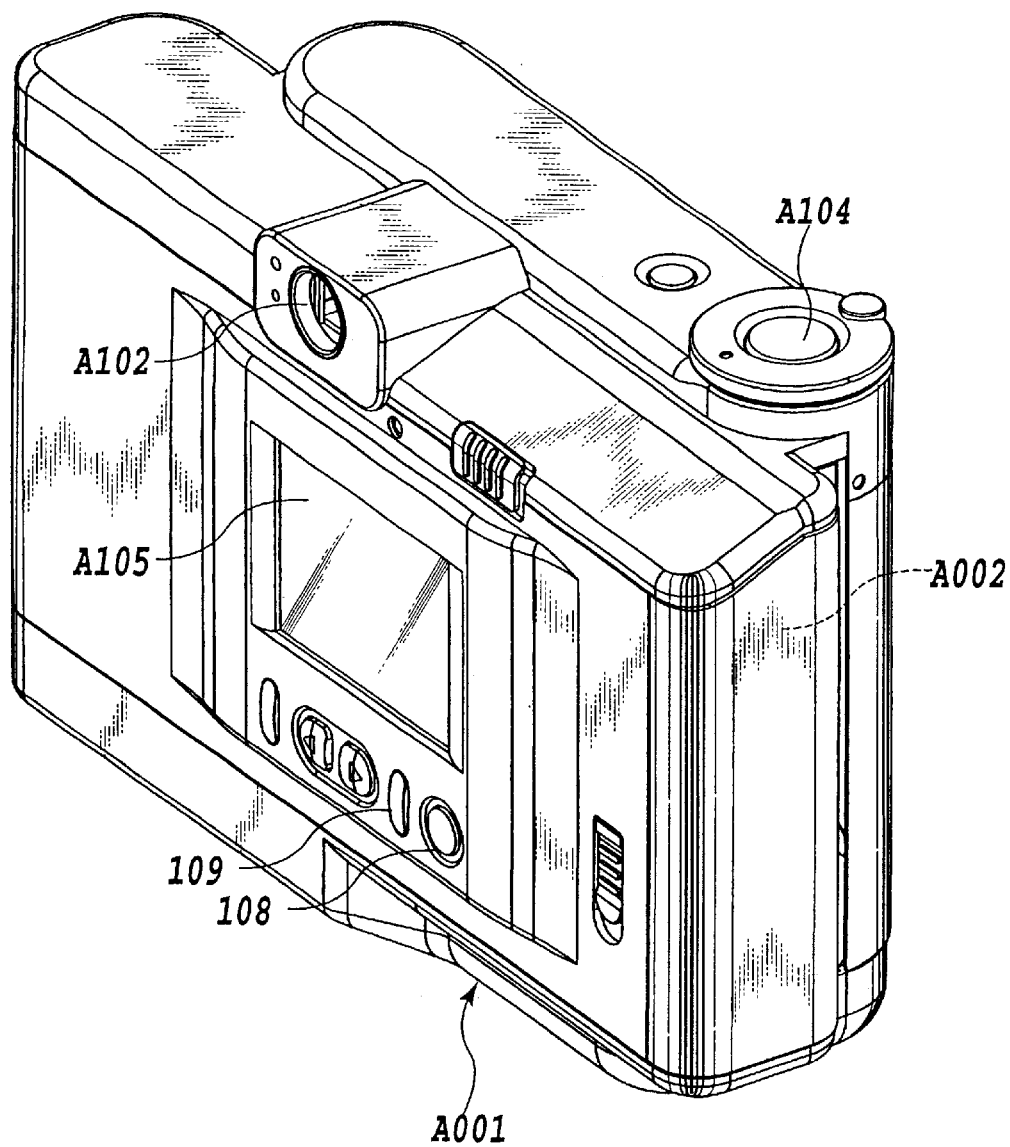
FIG. 3 is a perspective view of the camera in FIG. 1 viewing diagonally from the back thereof.

The camera section A100, which may be a conventional digital camera, constitutes the printer-built-in digital camera having an appearance in FIGS. 1 to 3 by being integrally incorporated into the main body A001 together with a printer section B100 described below. In FIGS. 1 to 3, A101 denotes a lens; A102 denotes a viewfinder; A102a denotes a window of the viewfinder; A103 denotes a flash; A104 denotes a shutter release button; and A105 denotes a liquid crystal display section (outer display section). The camera section A100, as described below, performs processing of photographed data by CCD, a recording of the images to a compact flash memory card (CF card) A107, a display of the images and a transmission of various kinds of data with the printer section B100. A109 denotes a discharge part for discharging a printing medium C104 on which the photographed image is recorded. A108, as shown in FIG. 5, is a battery functioning as a power source for the camera section A100 and the printer section B100.

2: Medium Pack

Figure 4:
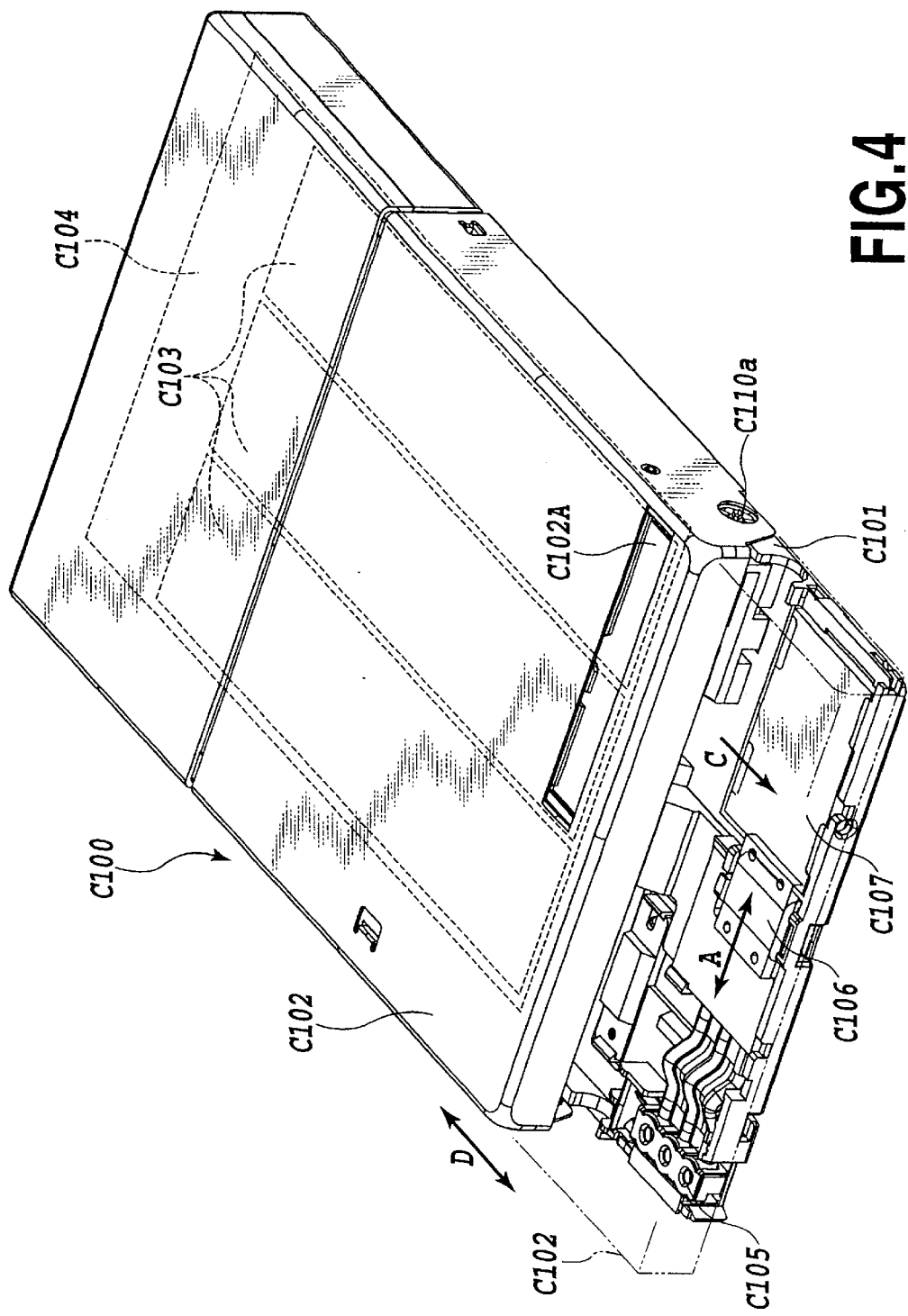
FIG. 4 is a perspective view of a medium pack insertable into the camera in FIG. 1.

A medium pack C100 is detachable relating to a main body A001 and, in the present embodiment, is inserted through an inserting section A002 of the main body A001 (see FIG. 3), thereby being placed in the main body A001 as shown in FIG. 1. The inserting section A002 is closed as shown in FIG. 3 when the medium pack C100 is not inserted therein, and is opened when the medium pack is inserted therein. FIG. 5 illustrates a status wherein a cover is removed from the main body A001 to which the medium pack C100 is inserted. As shown in FIG. 4, a shutter C102 is provided with a pack body C101 of the medium pack C100 in such manner being slidable in an arrow D direction. The shutter C102, which slides to stay at a position indicated by the two-dots-and-dashed lines in FIG. 4 when the medium pack C100 is not interested in the main body A001, while slides to a position indicated by the solid lines in FIG. 4 when the medium pack C100 is packed in the main body A001.

The pack body C101 contains ink packs C103 and printing mediums C104. In FIG. 4, the ink packs C103 are held under the printing mediums C104. In the case of the present embodiment, three ink packs C103 are provided so as to separately hold the inks of Y (yellow), M (magenta) and C (cyan), and about twenty sheets of the printing mediums C104 are stored in a pile. A suitable combination of those inks and the printing mediums C104 for recording an image is selected to be stored within the medium pack C100. Accordingly, the various medium packs C100 each having a different combination of the inks and the printing mediums (for example, medium packs for super high-quality image; for normal image; and for sealing (seal partitioning)) are prepared and, according to the kind of images to be recorded and the use of the printing medium on which an image is formed, those medium packs C100 are selectively inserted in the main body A001, thereby being able to perform an ensured recording of the images in compliance with the purpose by employing the most suitable combination of the ink and the printing medium. Further, the medium pack C100 is equipped with the below-mentioned EEPROM to which is recorded the identification data such as kinds or remaining amounts of the inks and the printing mediums contained in the medium pack.

The ink pack C103, upon the medium pack C100 is inserted in the main body A001, is connected to an ink supplying system in the main body A001, through three joints C105 each corresponding to the respective inks of Y, M and C. On the other hand, the printing mediums C104 are separated one by one using a separating mechanism which is not shown in the figures and then sent in a direction of arrow C by a paper feeding roller C110 (see FIG. 9). A driving force of the paper feeding roller C110 is supplied from conveying motor M002 (see FIG. 9) provided on the main body A001 through a connecting portion C110a.

Further, the pack body C101 comprises a wiper C106 for wiping a recording head of the below-described printer section, and an ink absorption body C107 for absorbing the abolished inks discharged from the printer section. The recording head in the printer section reciprocates in a direction of the main scanning direction as indicated by an arrow A in such manner described below. When the medium pack C100 is in the status of being removed from the main body A001, the shutter C102 slides to a position indicated by the two-dots-and-dashed lines in FIG. 4 to protect the joints C105, the wiper C106, the ink absorbing body C107 and so on.

3: Printer Section

The printer section B100 according to the present embodiment is a serial type employing an ink jet recording head. This printer section B100 is explained under the headings of 3-1" Printing Operating Section"; 3-2" Printing Medium Carrying"; and 3-3" Ink Supplying System", respectively.

3-1: Printing Operating Section

Figure 6:
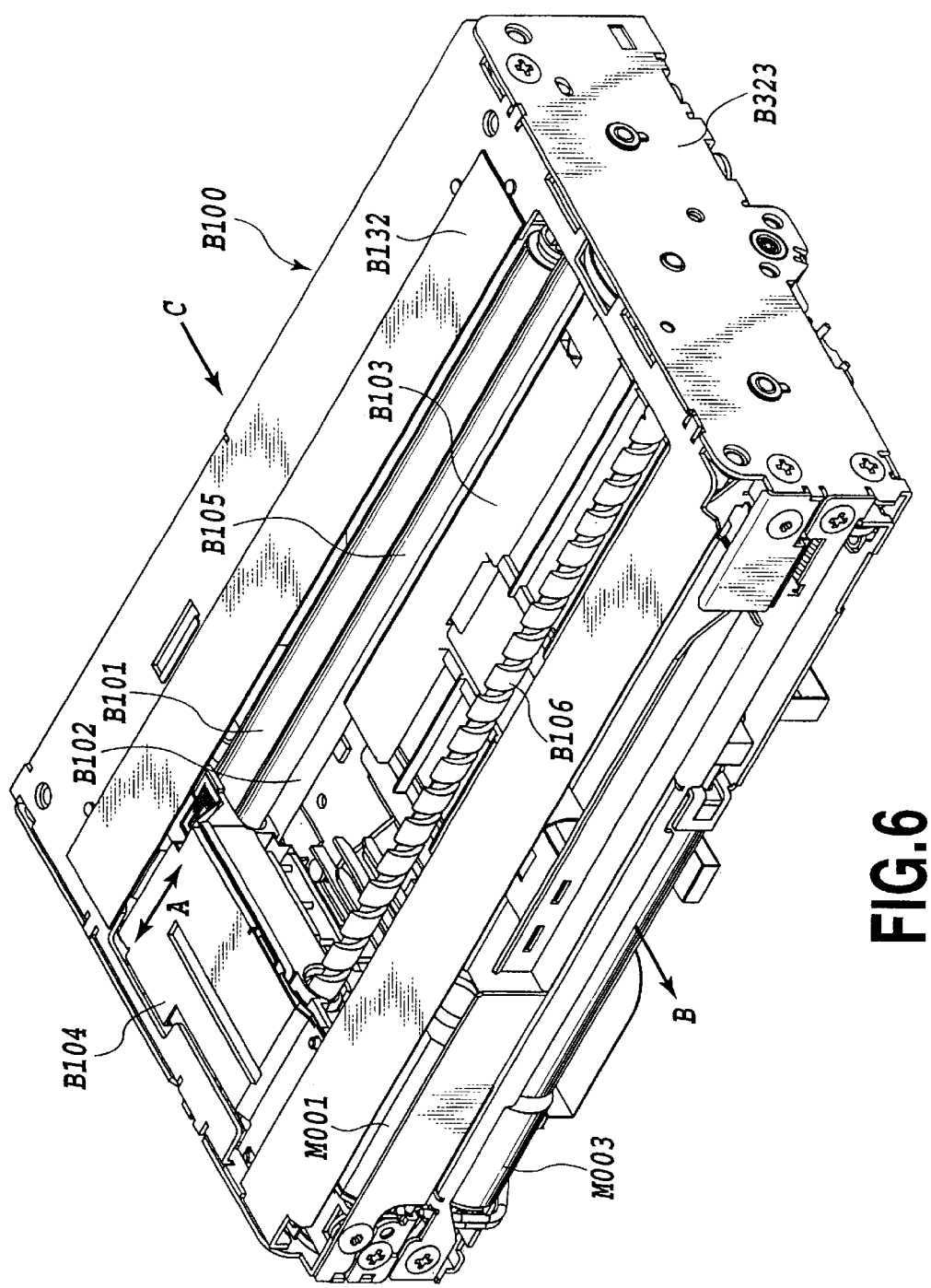
FIG. 6 is a perspective view of a printer section in FIG. 5.
Figure 7:
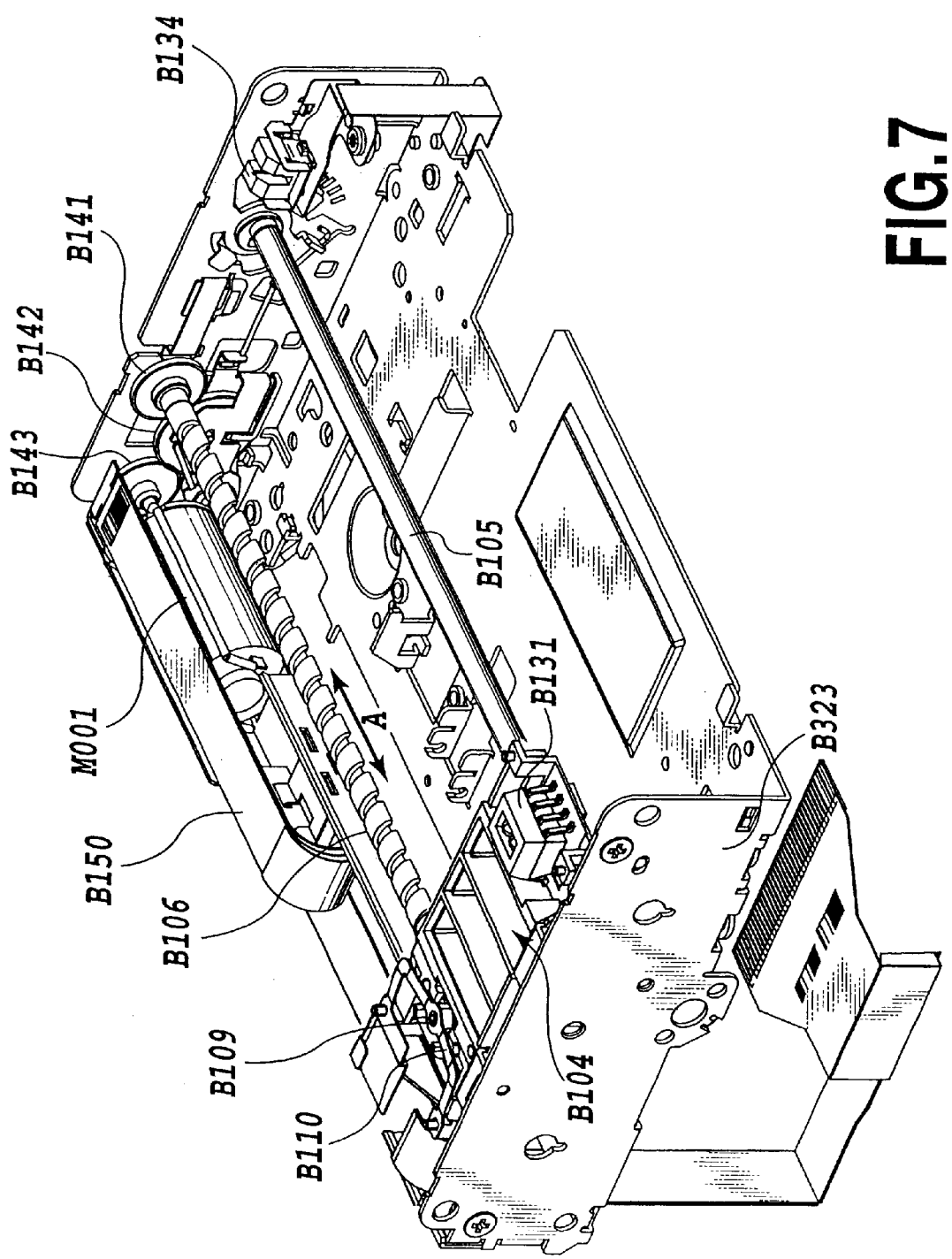
FIG. 7 is a perspective view in which a portion of the printer section in FIG. 6 is dislodged.

FIG. 6 is a perspective view illustrating the entire printer section B100, and FIG. 7 is a perspective view illustrating the printer section B100 with a part taken out.

At a predetermined position in the main body of the printer section B100, a tip portion of the medium pack C100 is positioned when the medium pack C100 is placed in the main body A001 as shown in FIG. 5. The printing medium C104 sent to the direction of an arrow C from the medium pack C100, while being sandwiched between a LF roller B101 and a LF pinch roller B102 of the below-mentioned printing medium carrying system, is carried to the sub-scanning direction indicated by an arrow B on a pressure plate B103. B104 denotes a carriage which reciprocates toward a main scanning direction indicated by an arrow A along a guiding shaft B105 and a leading screw B106.

Figure 8:
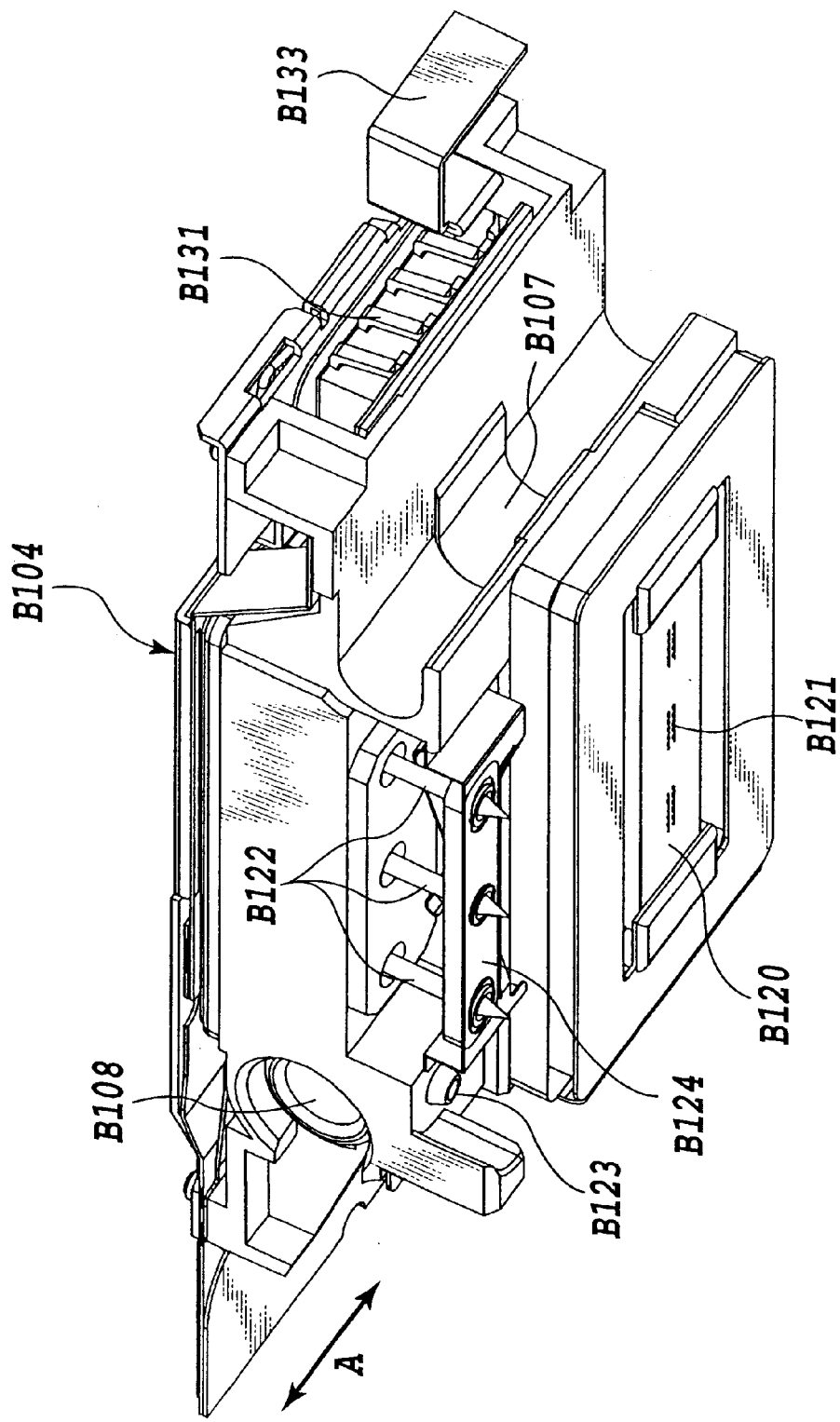
FIG. 8 is a perspective view of a carriage of the printer in FIG. 6.

As shown in FIG. 8, the carriage B104 is provided with a bearing B107 for a guiding shaft B105 and a bearing B108 for a leading screw B106. At a fixed position of the carriage B104, as shown in FIG. 7, a screw pin B109 projecting toward an interior of the bearing B108 is installed by a spring B110. A fit of a tip of the screw pin B109 to a helical thread formed on the outer circumference of the leading screw B106 converts a rotation of the leading screw B106 to a reciprocating movement of the carriage B104.

The carriage B104 is equipped with an ink jet recording head B120 capable of ejecting the inks of Y, M and C, and a sub-tank (not shown) for reserving inks to be supplied to the recording head B120. On the recording head B120, a plurality of ink ejection openings B121 (see FIG. 8), which are aligned with the direction crossing with the main scanning direction indicated by the arrow A (in the present embodiment, an orthogonal direction), are formed. The ink ejection openings B121 form nozzles capable of ejecting inks supplied from the sub-tank. As a generating means of energy for discharging the inks, an electrothermal converting element equipped with each of the nozzles may be used. The electrothermal converting element generates bubbles in the inks within the nozzle by heating and thus generated foaming energy causes an ejection of the ink droplet from the ink ejection opening B121.

The sub-tank has a capacity smaller than the ink packs C103 contained in the media pack C100 and made to be a sufficient size for storing a required amount of ink for recording an image corresponding to at least one sheet of printing medium C104. In the sub-tank, there are ink reserving sections for each of the inks of Y, M and C, on each of which is formed the ink supplying section and the negative pressure introducing sections, wherein those ink supplying sections are individually connected to the corresponding three hollow needles B122 and those negative pressure introducing sections are also connected to a common air suction opening B123. Such ink supplying sections, as will be mentioned below, are supplied with inks from the ink packs C103 in the medium pack C100 when the carriage B104 moves to a home position as illustrated in FIG. 6.

In the carriage B104 in FIG. 8, B124 denotes a needle cover which is moved to a position for protecting the needles B122 by the force of the springs as illustrated in FIG. 8 when the needles B122 and the joints C105 are not mated to each other, and which releases a projection of the needles B122 by being pushed upwardly against the force of the springs in FIG. 8 when the needles B122 and the joints C105 are mated with each other. A movement position of the carriage B104 is detected by an encoder sensor B131 on the carriage B104 and a linear scale B132 (see FIG. 6) on the main body of the printer section B100. Also, a fact that the carriage B104 moves to the home position is detected by a HP (home position) flag B133 on the carriage B104 and a HP sensor B134 (see FIG. 7) on the main body of the printer section B100.

In FIG. 7, at the both ends of the guiding shaft B105, supporting shafts (not shown) are provided at a position eccentric to the center axis of the guiding shaft. The guiding shaft B105 is turned and adjusted upon the supporting shaft, thereby controlling a height of the carriage 104, resulting in achieving an adjustment of a distance between the recording head B120 and the printing medium C104 on the pressure plate B103. The leading screw B106 is rotatably driven by a carriage motor M001 through a screw gear B141, an idler gear B142 and a motor gear B143. B150 denotes a flexible cable for electrically connecting the after-mentioned controlling with the recording head B120.

The recording head B120 moves together with the carriage B104 toward the main scanning direction indicated by the arrow A and concurrently ejects the ink from the ink ejection openings B121 in accordance with the image signals, thereby recording an image corresponding to one band on the printing medium on the pressure plate B103. Alternately repeating a recording operation of an image corresponding to one band by such recording head B120 and a conveying operation of the predetermined amount of the printing medium toward the sub-scanning direction indicated by the arrow B by means of the below-mentioned printing medium conveying system enables a sequential recording of the images on the printing medium.

3-2: Printing Medium Carrying

Figure 9:
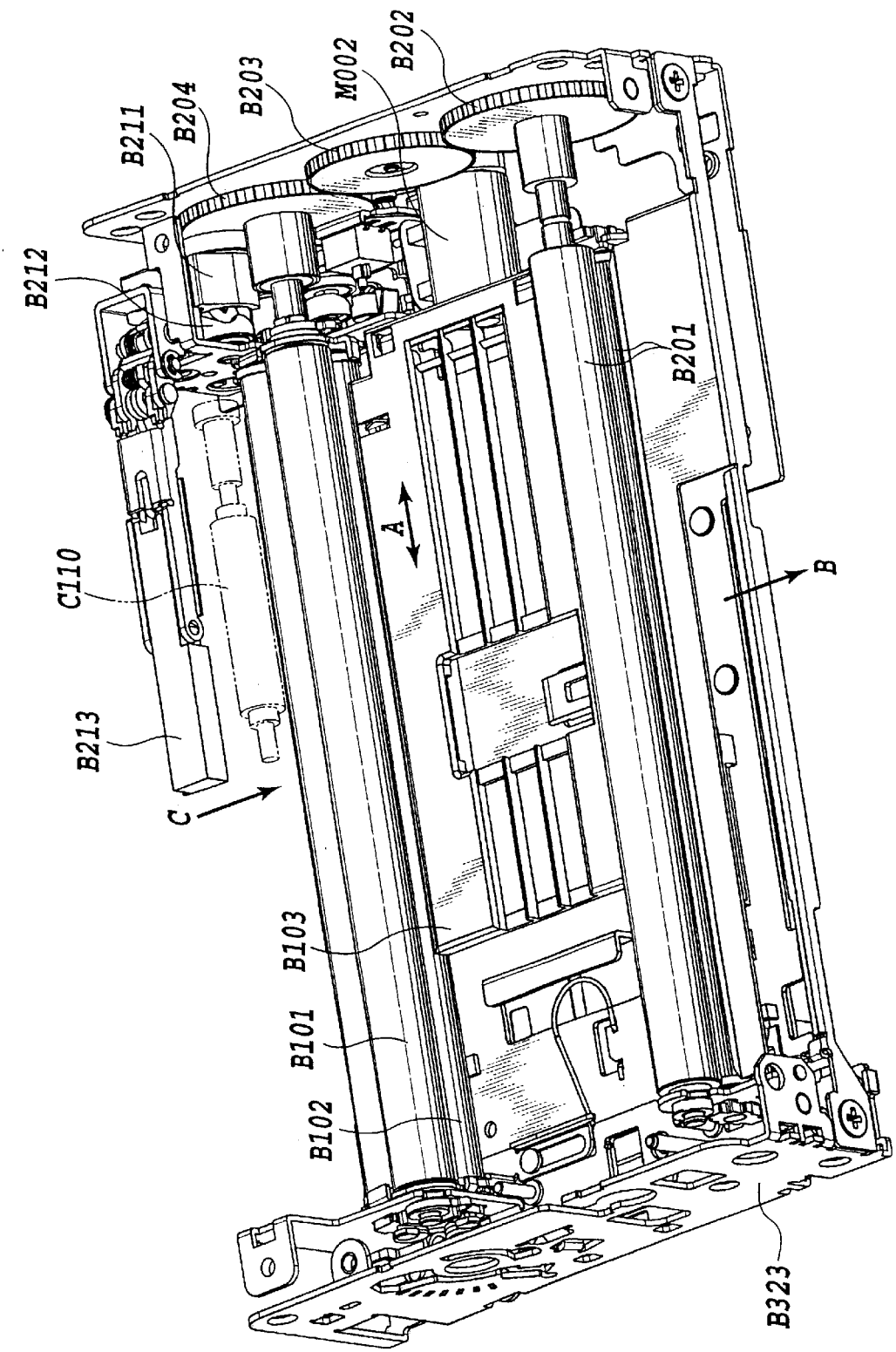
FIG. 9 is a perspective view of a component part of a printing medium carrying of the printer section in FIG. 6.

FIG. 9 is a perspective view showing a component of the printing medium conveying system of the printer section B100. In FIG. 9, B201 denotes a pair of paper delivering rollers, and the upper one of the paper delivering rollers B201 in FIG. 9 is driven by a conveying motor M002 through the paper delivering roller gear B202 and a junction gear B203. Likewise, the aforementioned LF roller B101 is driven by the conveying motor M002 through a LF roller gear B204 and the junction gear B203. The paper delivering roller B201 and the LF roller B101 convey the printing medium C104 toward the sub-scanning direction indicated by the arrow B by a driving force of the conveying motor M002 rotating in the forward direction.

On the other hand, when the conveying motor M002 counter-rotates, a pressure plate head B213 and a locking mechanism which is not shown are driven through a switching slider B211 and a switching cam B122, while a driving force is transmitted to the paper feeding roller C110 on the medium pack C100. That is, the pressure plate head B213 pressurizes the printing mediums C104, which are piled up within the medium pack C100, in a downward direction in FIG. 4 by a driven force caused by a reverse rotation of the carrying motor M002, through a window portion C102A (see FIG. 4) of a shutter C102 of the medium pack C100. As a result thereof, the printing medium C104 positioned at the lowest position in FIG. 4 is pressed against the feeding roller C110 in the medium pack C100. Also, the locking mechanism which is not shown locks the medium pack C100 to the main body A001 by a driven force caused by a reverse rotation of the carrying motor M002 to inhibit a removal of the medium pack C100. The feeding roller C110 of the medium pack C100 feeds one piece of the printing medium C104 at the lowest position in FIG. 4 toward the direction indicated by the arrow C as a result that the driven force caused by the reverse rotation of the conveying motor M002 is transmitted.

As stated above, only one piece of printing medium C104 is taken out from the medium pack C100 toward the direction indicated by the arrow C by the reverse rotation of the conveying motor M002, and then a forward rotation of the conveying motor M002 conveys the printing medium C104 to the direction indicated by the arrow B.

3-3: Ink Supplying System

Figure 10:
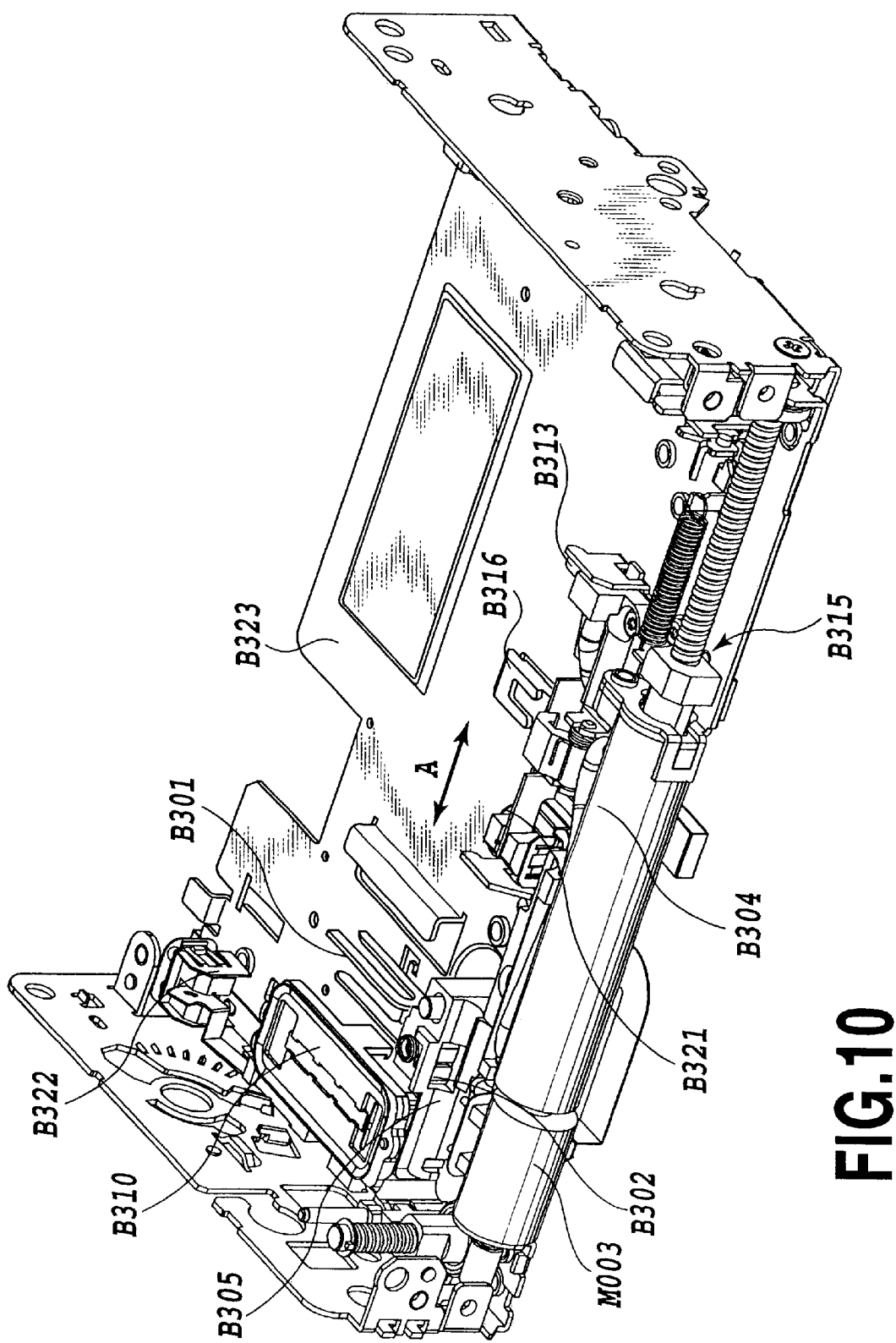
FIG. 10 is a perspective view of a component part of the ink supplying of the printer section in FIG. 6.
Figure 11:
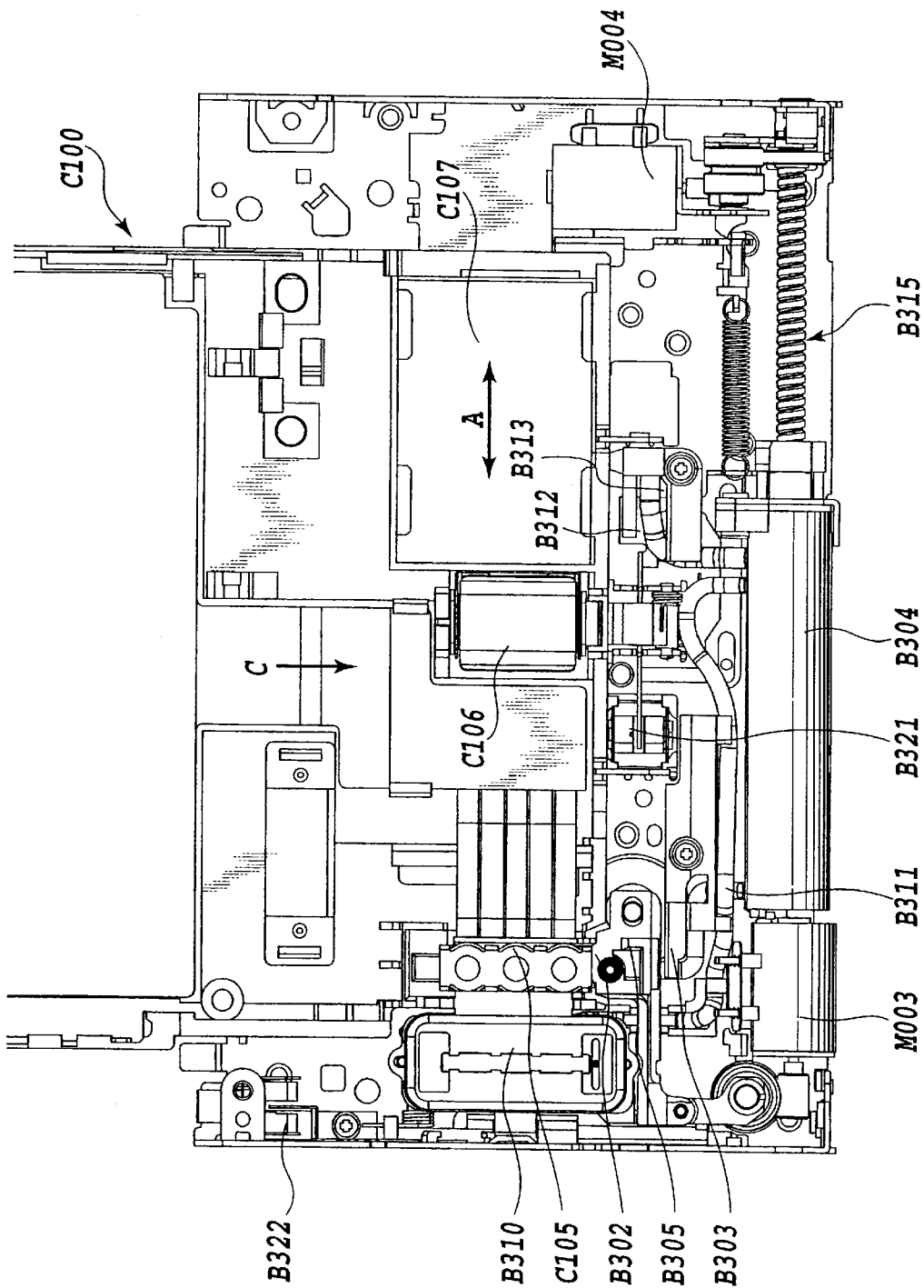
FIG. 11 is a plan view illustrating that the medium pack is inserted into a component part of the ink supplying in FIG. 10.

FIG. 10 is a perspective view showing a component part of an ink supplying system of the printer section B100; FIG. 11 is a plan view showing a status where the medium pack C100 is inserted in the component part of the ink supplying system.

A joint C105 of the medium pack C100 installed to the printer section B100 is positioned below the needles B122 (see FIG. 8) on the carriage B104 moved to a home position. The main body of the printer section B100 is equipped with a joint fork B301 (see FIG. 10) positioned below a joint C105, and an upward movement of the joint C105 caused by the joint fork B301 establishes a connection of the joint C105 to the needles B122. As a result thereof, an ink supplying path is formed between the ink packs C103 in the medium pack C100 and the ink supplying sections on the sub-tank on the carriage B104. Further, the main body of the printer section B100 is equipped with a suction joint B302 positioned below an air suction opening B123 (see FIG. 8) of the carriage B104 moved to the home position. This suction joint B302 is connected to a pump cylinder B304 of a pump serving as a negative pressure generating source, through a suction tube B303. The suction joint B302 is connected to the air suction opening B123 on the carriage B104 according to the upward movement caused by a joint lifter B305. In the light of the foregoing, a negative pressure introducing path, between a negative pressure introducing section of the sub-tank on the carriage B104 and the pump cylinder B304, is formed. The joint lifter B305 makes the joint fork B301 move up and down together with the suction joint B302 by a driving power of the joint motor M003.

The negative pressure introducing section of the sub-tank is equipped with a gas-liquid partition member (not shown) which allows a passing through of air but prevents a passing through of the inks. The gas-liquid partition member allows a passing through of the air in the sub-tank to be suctioned through the negative pressure introducing path, and as a result, an ink is supplied to the sub-tank from the medium pack C100. Then, when the ink is sufficiently supplied to the extent that the ink in the sub-tank reaches to the gas-liquid partitioning member, the gas-liquid partitioning member prevents the passing through of the inks, thereby automatically stopping a supply of the inks. The gas-liquid partitioning member is equipped with the ink supplying section in the ink storing sections for the respective inks in the sub-tank, and thus the ink supplying is automatically stopped with respect to each ink storing section.

The main body of the printer section B100 is further equipped with a suction cap B310 capable of capping with respect to the recording head B120 (see FIG. 8) on the carriage B104 which moved to the home position. The suction cap B310 has introduced therein negative pressure from the pump cylinder B304 through suction tube B311, so that the inks can be suctioned and emitted (suction recovery processing) from the ink ejection openings B121 of the recording head B120. Further, the recording head B120, as required, makes the ink, which does not contribute to a recording of an image, ejection into the suction cap B310 (preliminary ejection processing). The ink within the suction cap B310 is discharged into the ink absorption body C107 in the medium pack C110 from the pump cylinder B304 through a waste liquid tube B312 and a waste liquid joint B313.

The pump cylinder B304 constitutes a pump unit B315 together with a pump motor M004 for enabling a reciprocate drive of the pump cylinder. The pump motor M004 also functions as a driving source by which a wiper lifter B316 (see FIG. 10) is moved up and down. The wiper lifter B316 makes the wiper C106 of the medium pack C100 placed in the printer section B100 move upwardly, thereby displacing the wiper C106 to a position capable of a wiping of the recording head B120.

In FIGS. 10 and 11, B321 denotes a pump HP sensor for detecting if an operating position of the pump, which is constituted by the pump cylinder B304, lies at the home position. Further, B322 denotes a joint HP sensor for detecting if the aforementioned ink supplying path and the negative pressure introducing path were formed. Still further, B323 denotes a chassis for constituting a main body of the printer section B100.

4: Signal Processing

Figure 12:
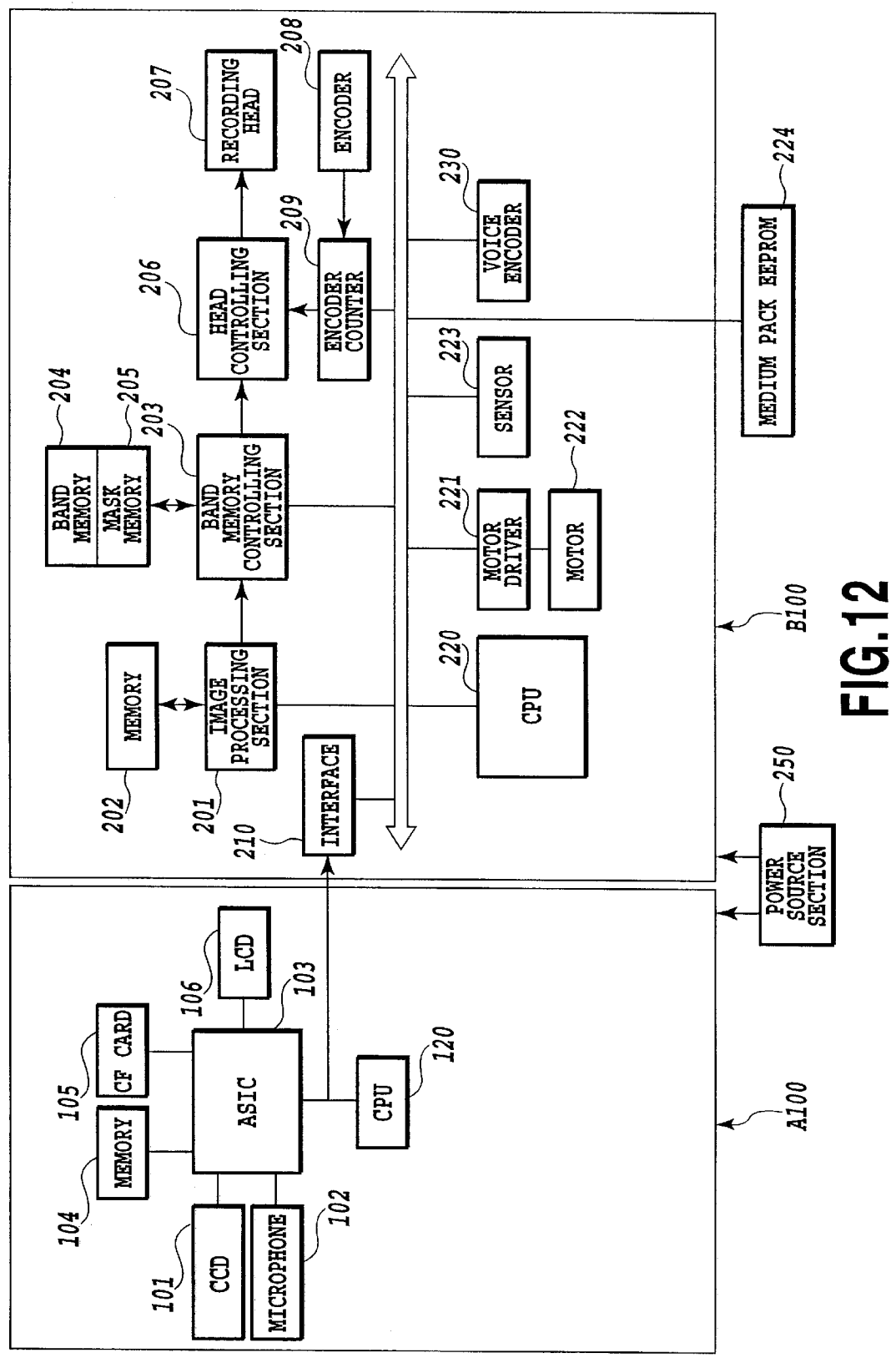
FIG. 12 is a block schematic diagram of the camera section and the printer section of the camera in FIG. 1.

FIG. 12 is a block diagram generally showing the camera section A100 and the printer section B100.

In the camera section A100, 101 denotes a CCD as an image element; 102 denotes a microphone for inputting voice; 103 denotes an ASIC (Application Specific IC) for performing various processing; 104 denotes a first memory for temporary storing an image data and the like; 105 denotes a CF (compact flush) card (corresponding to a "CF card A107") for recording the photographed image; 106 denotes a LCD (corresponding to a "liquid crystal display section A105") which displays the photographed image or a replayed image; and 120 denotes a first CPU for controlling the camera section A100.

In the printer section B100, 210 denotes an interface between the camera section A100 and the printer section B100; 201 denotes an image processing section (including a binary processing section for binarizing an image); 202 denotes a second memory to be used in performing the image processing; 203 denotes a band memory controlling section; 204 denotes a band memory; 205 denotes a mask memory; 206 denotes a head controlling section; 207 denotes a recording head (corresponding to the "recording head B120"); 208 denotes an encoder (corresponding to the "encoder sensor B131"); 209 denotes an encoder counter; 220 denotes a second CPU for controlling the printer section B100; 221 denotes motor drivers; 222 denotes motors (corresponding to the motors M001, M002, M003 and M004"); 223 denotes sensors (including the "HP sensors B134, B321 and B322"); 224 denotes an EEPROM contained in the medium pack C100; 230 denotes a voice encoder section and 250 denotes a power source section for supplying electric power to the entire device (corresponding to the "battery A108").

Figure 13:
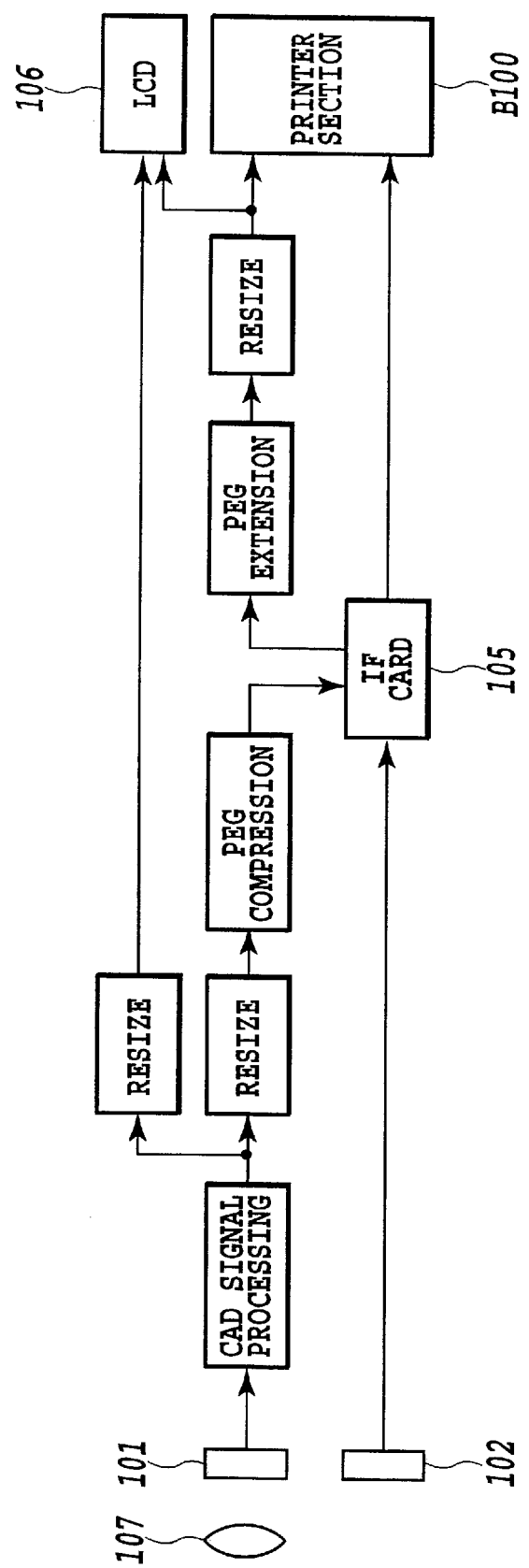
FIG. 13 is a schematic diagram of a signal processing performed in the camera section in FIG. 12.

FIG. 13 is a schematic diagram showing a signal processing in the camera section A100. In a photographing mode, an image photographed by the CCD 101 through a lens 107 is signal-processed (CCD signal processing) by ASIC 103 and then is converted to YUV intensity with two-color-different signal. Further, the photographed image is resized to a predetermined resolution and recorded on a CF card 105 using a compression method by JPEG, for example. Also, a voice is inputted through a microphone 102 and stored in the CF card 105 through the ASIC 103. A recording of the voice can be performed in such manner recording at the same time of photographing, or after photographing so called an after-recording. In a replay mode, the JPEG image is read out from the CF card 105, extended by the JPEG through the ASIC 103 and further resized to be a resolution for displaying, thereby being displayed on the LCD 106.

Figure 14:
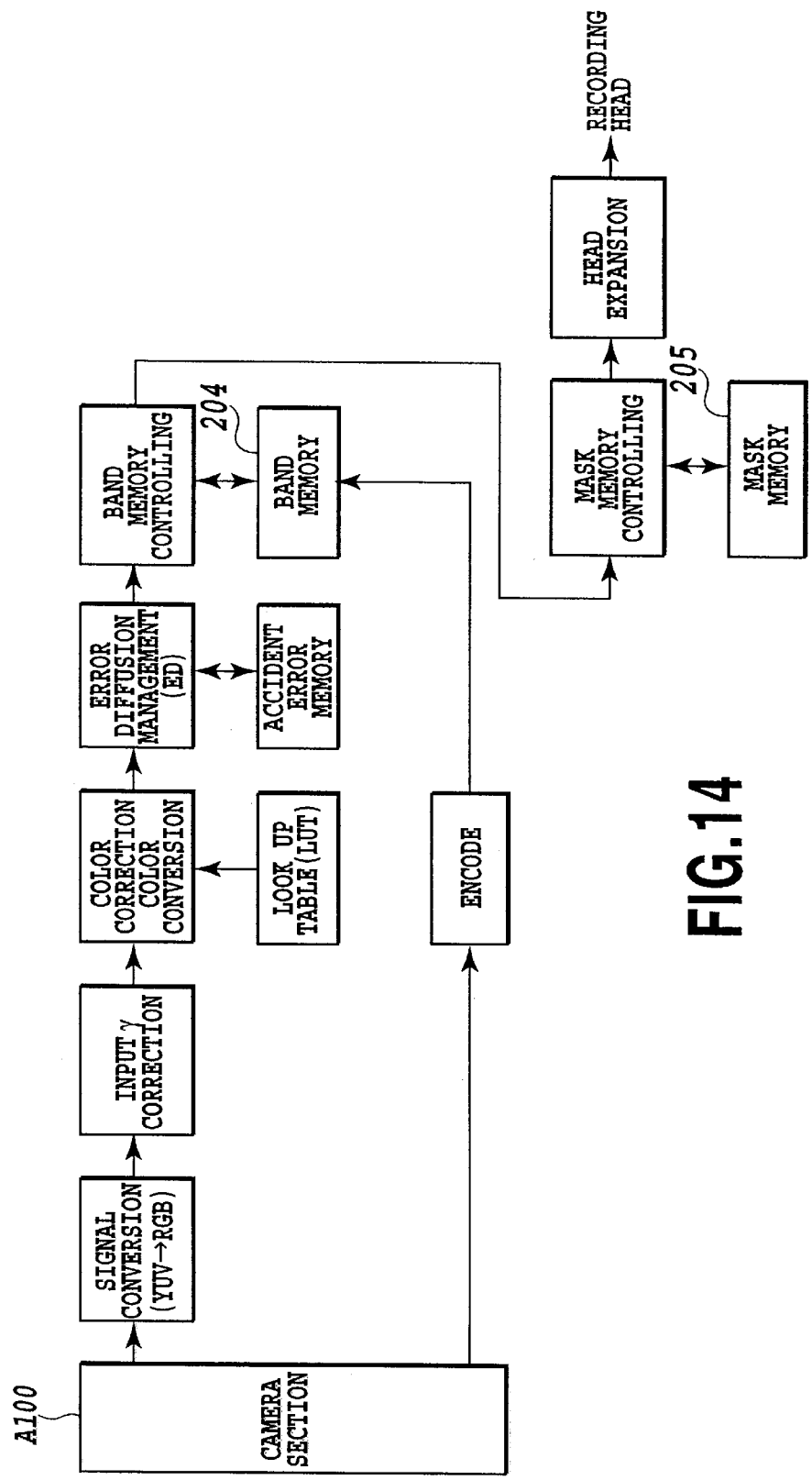
FIG. 14 is a schematic diagram of a signal processing performed in the printer section in FIG. 12.

FIG. 14 is a schematic diagram showing signal processing performed in the printer section B100.

An image replayed on the camera section A100, that is the image being read out from the CF card 105, is extended by the JPEG through ASIC 103 as shown in FIG. 13 to resize a resolution to a suitable size for printing. Then, the resized image data (YUV signal), through an interface section 210, is transferred to the printer section B100. As shown in FIG. 14, the printer section B100 performs an image processing of an image data transferred from the camera section A100 by an image processing section 201, thereby performing an conversion of the image data to a RGB signal, an input γ correction in accordance with the features of a camera, a color correction and a color conversion using a look up table (LUT), and an conversion to a binarized signal for printing. When performing the binarizing processing, in order to perform an error diffusion (ED), a second memory 202 is utilized as an error memory. In the case of the present embodiment, though a binarizing processing section in the image processing section 201 performs the error diffusion processing, in other processing may be performed such as a binarizing processing using a dither pattern. The binarized printing data is stored temporary in the band memory 204 by a band memory controlling section 203. An encoder pulse from the encoder 208 enters into the encoder counter 209 of the printer section B100 every time the carriage B104 carrying the recording head 207 and the encoder 208 moves a certain distance. Then, in sync with this encoder pulse, a printing data is read out from the band memory 204 and the mask memory 205, and, based on thus obtained printing data, the head controlling section 206 controls the recording head 207 to perform a recording.

A band memory shown in FIG. 14 is explained below.

A plurality of nozzles in the recording head 207, for example, is formed in array so as to achieve a density of 1200 dpi (dots/inch). For recording the image by using such recording head 207, upon performing one scanning by the carriage, it is preferred to previously prepare a recording data (a recording data corresponding to one scanning) corresponding to the number of nozzles in the sub-scanning direction (hereinafter, also referred to as a "column (Y direction)") and a recording data corresponding to the recording area in the scanning direction (hereinafter, also referred to as a "row (X direction)", respectively. The recording data is created in the image processing section 201 and then is temporary stored in the band memory 204 by the band memory controlling section 203. After the recording data corresponding to one scan is stored in the band memory 204, the carriage is scanned in the main scanning direction. In so doing, an encoder pulse inputted by the encoder 208 is counted by the encoder counter 209 and, in accordance with this encoder pulse, a recording data is read out from the band memory 204. Then, on the basis of the image data, ink droplets are ejected from the recording head 207. In the case that a bidirectional recording system wherein an image is recorded upon outward scanning and homeward scanning (outward recording and homeward recording) of the recording head 207 is employed, the image data is read out from the band memory 204 depending on the scanning direction of the recording head 207. For example, an address of the image data read out from the band memory 204 is increased sequentially when the outward recording is performed, while an address read out from the band memory 204 is decreased sequentially when the homeward scanning is performed.

In a practical sense, writing of an image data (C, M and Y) created by the image processing section 201 into the band memory 204 and a subsequent preparation of the image data corresponding to the one band enable a scanning of the recording head 207. Then, the image data is read out from the band memory 204 subsequent to a scan of the recording head 207, so that the recording head 207 records the image on the basis of the image data. During the recording operation, image data to be recorded next is created at the image processing section 201 and thus created image data is written into an area of the band memory 204 corresponding to a recording position.

As has been stated above, the band memory controlling is carried out in such manner that a writing operation in which recording data (C, M, Y) created by the image processing section 201 is written into the band memory 204 and a reading operation for transferring the recording data (C, M, Y) to the head controlling section 206 in accordance with a scanning movement of the carriage are changed over.

A mask memory controlling in FIG. 14 is explained as below.

This mask memory controlling is required when a multi-pass recording system is employed. In using the multi-pass recording system, the recording image corresponding to one line which has a width corresponding to a length of the nozzle array of the recording head 207 is divided to a plurality of scanning of the recording head 207 to record. That is, conveying amount of the printing medium to be intermittently carried to the sub-scanning direction is made to be 1/N of a length of the nozzle array. For example, when N=2, a recording image corresponding to one line is divided into two scans to record (two-pass recording), and when N=4, a recording image corresponding to one line is divided into four scans to record (four-pass recording). In similar fashion, when N=8, it becomes eight-pass recording, and when N=16, it becomes sixteen-pass recording. Therefor, the recording image corresponding to one line will be completed by a plurality of scans of the recording head 207.

Practically, a mask data for assigning the image data to a plurality of scans of the recording head 207 is stored in the mask memory 205, and then based on a conjunction (AND) data between the mask data and the image data, the recording head 207 ejects inks to record the image.

Also, in FIG. 14, voice data stored in the CF card 105, like the image data, is transferred to the printer section B100 through an interface 210 by the ASIC 102. The voice data transferred to the printer section B100 is encoded at the voice encoder 230 and then recorded with the image to be printed as a code data. When there is no necessity of inputting voice data into a printing image, or when printing an image without a voice data, of course, the encoded voice data is not printed but only the image is printed.

In the present embodiment, the present invention has been explained as a printer-built-in camera integral with a camera section A100 and printer section B100. However, it would be possible to make each of the camera section A100 and the printer section B100 a separate device and to form in a similar manner as a structure in which those devices are connected each other by the interface 210 to realize a similar function.

[Specific Structure of the Present Invention]

The embodiments including the specific structure of the present invention is set forth below.

Figure 15:
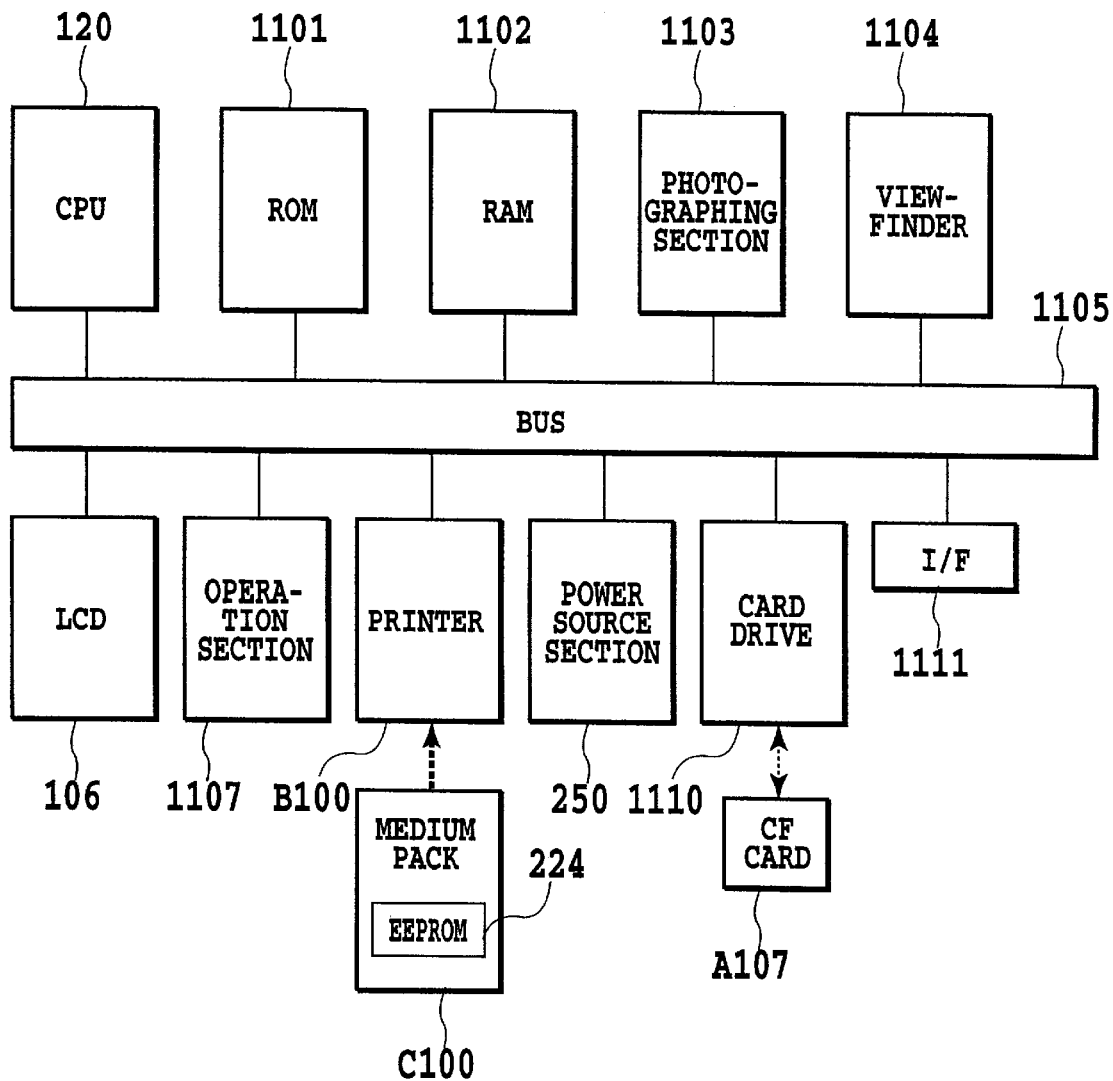
FIG. 15 is a block diagram showing one embodiment of a digital camera controlling system for realizing a specific structure of the present invention relating to the basic structure as shown in FIG. 12.

FIG. 15 shows, relating to the above-stated basic structure, one example of the digital camera controlling system for particularly realizing the specific structure of the present invention.

In FIG. 15, denoted as 1101 is a ROM for storing fixed data, such as programs and the like to be carried out by the CPU 120 for processing procedure (will be described below) in a printing mode in which image data is printed by the printer section B100 and a photographing mode. Denoted as 1102 is a RAM which corresponds to the aforementioned memory 104 and is used as a working area upon executing a processing program, which will be described with reference to FIG. 16, an area for temporarily storing the photographed image information being read from a photographing section 1103 including CCD 101 as a photographing element and the like, and an area for temporarily storing an image information being read from the CF card A107 as a storing medium to be inserted into a card drive 1110. Denoted as 1104 is a viewfinder which displays an image information to be imported and photographed by the photographing section 103.

The LCD 106, as mentioned above, redisplays the image information imported and photographed by the photographing section 1103, or the image information which is stored in the CF card A107 and imported through the card drive 1110. Denoted 107 is an operation section operable by an user, having a release button A104, a photographing mode/printing mode switching key, a selection key of the image to be displayed or printed, and a key for setting an image forming mode at the printing section (a full bleed printing or a printing with a frame or margin) and the like.

The printer section B100, as stated above, serves to print the photographed images and the like. The printer section B100 can receive paper by inserting the medium pack C100 therein, the consumed material storing container for the printer, thereby being capable of performing a printing operation. The printer section further performs a reading of information written in the EEPROM 224 equipped with the medium pack C100. Also, the medium pack C100, as described above, may include inks to be supplied to the printer section B100. Still further, the EEPROM 224 stores information of the number of sheets of paper contained in the medium pack C100 other than information of the size and kinds contained therein.

The card drive 1110 stores the image information imported and photographed by the photographing section 1103 in the CF card A107, and vice versa. Denoted 1111 is the interface (I/F) section for performing a transmit/receive of the image information with an external device such as a personal computer through USB communication and the like.

An operating power is provided from the power source section 250 for each section of the above-mentioned control system. Further, denoted as 1105 is a CPU bus for connecting the above mentioned sections to each other, which includes an address bus for transmitting address signals, a control bus for transmitting control signals and a data bus for transmitting data.

Figure 16:
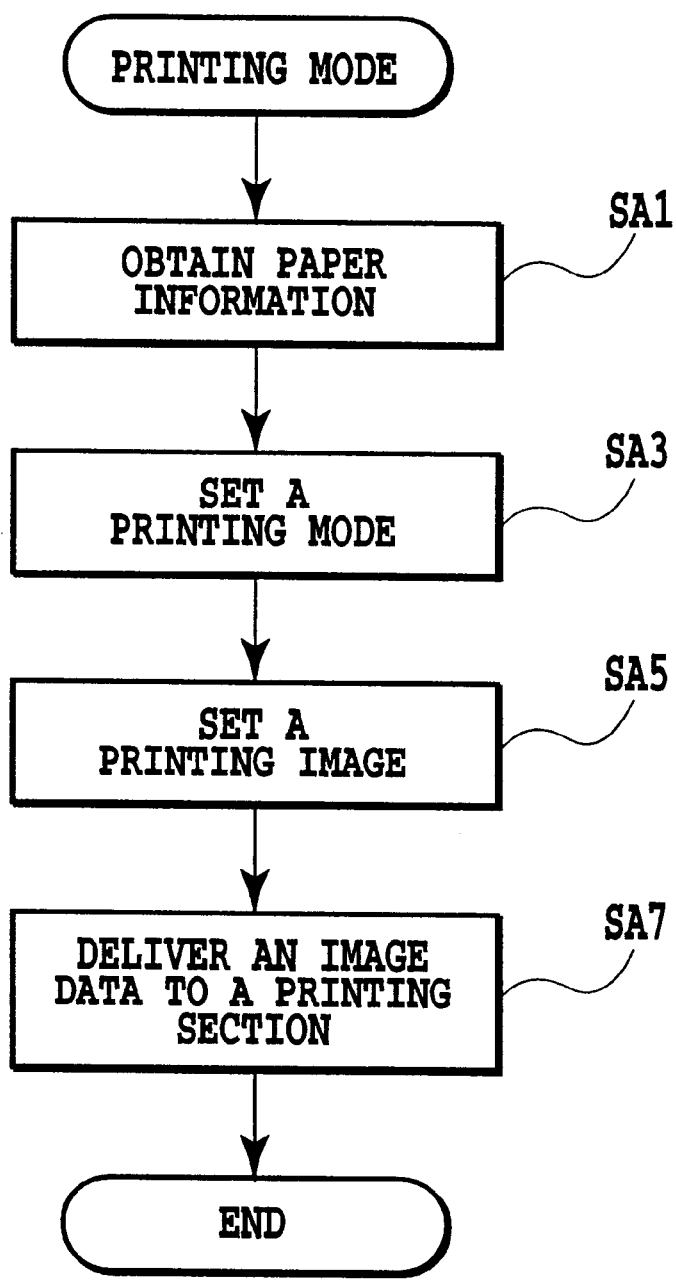
FIG. 16 is a flow chart showing one example of a processing procedure performed by the digital camera controlling system in FIG. 15 at a printing mode.

FIG. 16 is a flow chart showing one example of a processing procedure upon printing mode performed by the digital camera controlling system in FIG. 15. This procedure can be made to be actuated, for example, when the user switches the mode to the printing mode, in order to print out the image information obtained through the photographing section 1103 upon photographing and stored in the RAM 1102 by the printer section B100, or in order to print out the replayed image information which is stored in a nonvolatile recording medium such as the CF card A107 by the printer section B100.

When this procedure is started, firstly, in step SA1, paper information such as kinds and/or size of the printing medium (paper) stored in the medium pack C100 which is inserted in the printer section B100 is obtained from the nonvolatile memory EEPROM 224 within the medium pack C100 through the printer section B100.

In step SA3, obtained is printing information that is designated by the user referring to an operation menu displayed on the LCD 106, and that the user has decided to input through the operation section 1107. This printing information, as the information for deciding a printing range, may include the information regarding the image forming mode, such as performing full bleed printing without a space or margin along the edge of the printing paper C104, or performing printing while leaving the margin along the edge, or performing printing at a predetermined position and by a predetermined size within a template.

In step SA5, a setting of image data to be printed is performed. This setting may includes a setting of the photographed data displayed in the LCD 106, or a processing for accepting a setting for selecting the image information redisplayed on the LCD 106 which was imported through the card drive 1110. Also, a processing for clearly specifying a printable area relating to the image information displayed on LCD 106 may be accompanied to the foregoing processing based on the paper information obtained by step SA1 and the user designated printing information obtained by step SA3.

Further, in step SA7, the image data set by step SA5 is delivered to the printer section B100 together with the user designated printing information.

Figure 17:
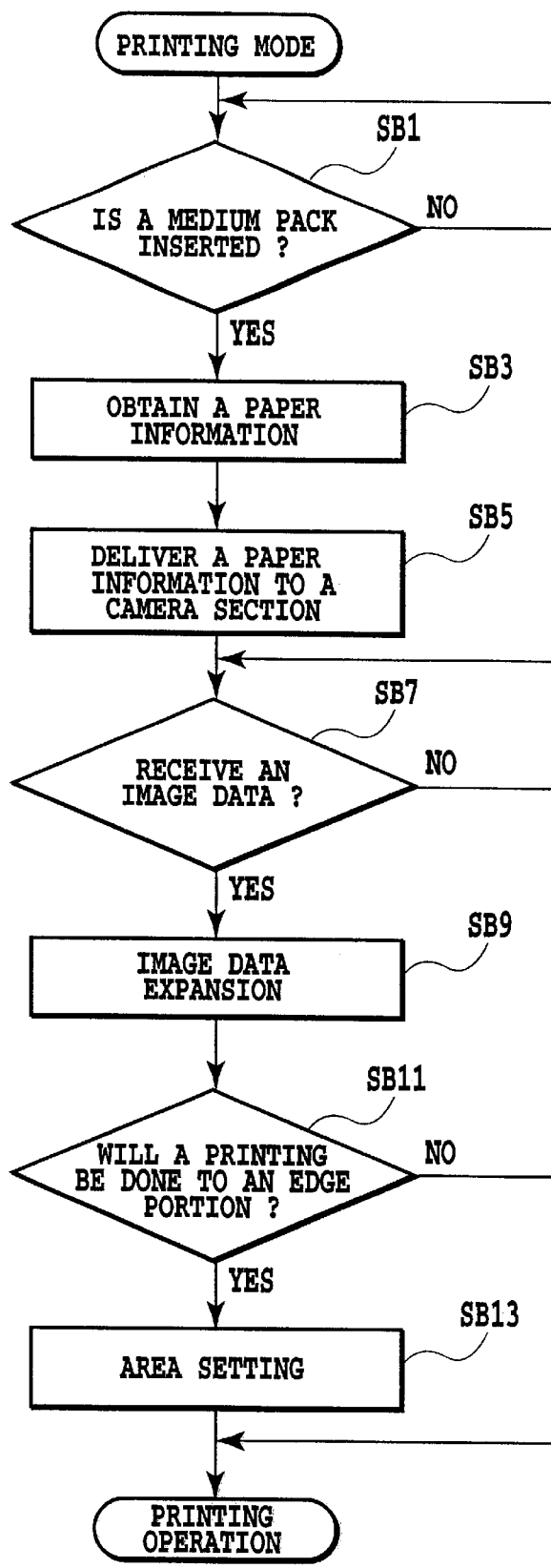
FIG. 17 is a flow chart showing one example of a paper edge data setting procedure performed by the printer section in FIG. 12 at the printing mode.

FIG. 17 is a flow chart showing one example of the procedures performed by the printer section B100 at the printing mode.

In this procedure, it is first judged in step SB1 whether it is with or without the medium pack C100 and then, in the case of being with the medium pack, paper information such as the kind and the size of the printing medium (paper) stored in the medium pack C100 is obtained from the nonvolatile memory EEPROM 224 within the medium pack C100, in step SB3.

In step SB5, thus obtained paper information is notified to the camera A100. Then, in step SB7, the image data transmitted from the camera A100 by the steps as showing in FIG. 16 is waited.

When the image data is delivered from the camera A100, the image data is imported to the predetermined image data buffer in step SB9, and at the same time, the image forming mode to the printing medium is recognized based on the user designated printing information. In step SB11, it is judged whether the printing will be performed with the margin along all the edges of the printing medium or the printing is performed without the margin along a portion or all of the edges of the printing medium. If such judgement results in the latter, an area setting is made in step SB13 in order to provide a suitable reducing processing of the applying amount of the printing agent for an edge portion that is the area including an area of the end or edge of the printing medium and an area of predetermined range along with the end or edge without the margin, and then segue to the printing operation.

Figure 18:
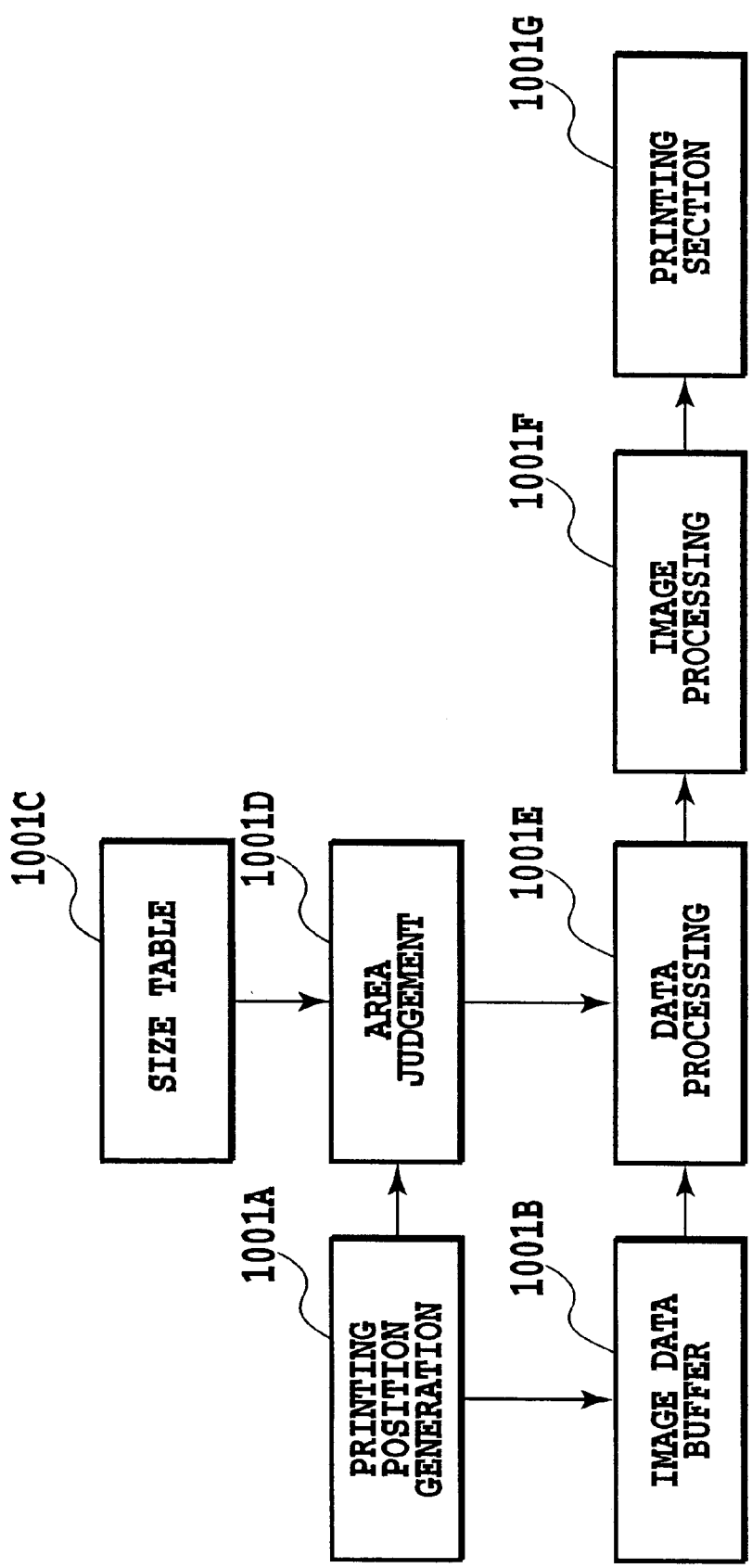
FIG. 18 is a conceptual diagram of a printing processing according to one of the embodiments of the present invention.

FIG. 18 is a conceptual diagram showing a printing process conducted by the printer section B100 according to one of the embodiments of the present invention.

The printer section B100 reads out the image data from the exterior (corresponding to camera A100 in the present embodiment) to store the image data in a buffer 1001B (for example, the memory 202 in FIG. 12). Upon the printing operation, the image data, each of dot printing positions thereof is defined by a printing position generating section 1001A, is called out from the image data buffer 1001B to send to a data processing section 1001E.

Whether or not the printing position defined by the printing position generating section 1001A based on the setting of the image forming mode falls on the area of the edge and the predetermined range therealong is judged by an area judgement section 1001D to transmit thus obtained result to the data processing section 1001E. The area judgement section 1001D performs the judgement according to the size of the paper to be printed, by using a size table 1001C in which the paper size data is stored. Such size table 1001C is efficient for enabling the printing that is applicable to a plurality of kinds and various size of the paper, and made to be a table which correlates such paper information to the printing range information according to the image forming mode to store therein.

The data processing section 1001E processes the data inputted from the image data buffer 1001B only in the case of being judged as the area of edge and the predetermined range therealong.

The data processing section 1001E of the present embodiment is made to perform the data processing in the process of the signal processing shown in FIG. 14 by the image processing section 201 shown in FIG. 12. For instance, at the subsequent stage of the signal conversion (conversion from YUV data to RGB data) shown in FIG. 14, a processing of the RGB data is provided with the area of the edge and the predetermined range therealong, thereby achieving a lowering of the printing density thereof. This can be achieved, for example, by making the data of the area of the edge and the predetermined range therealong approach to "0" by a predetermined ratio (for instance, a predetermined coefficient "0.5" and the like which is smaller than 1 is multiplied to the data) with the proviso that each of the RGB signal data is 8 bits, and becomes the lowest density at "0" and becomes the highest density at "255".

Subsequent to the above, the image data including the processed data is provided with an image processing including a color correction, a color conversion, a band processing, and a mask processing (1001F). Then, the printing operation is performed by the printing section 1001G including the head controlling section 206 and the recording head 207.

Meantime, a function of the above-mentioned structure may be achieved with a software that is executed by the CPU 220 while properly using a hardware structure shown in FIG. 12.

The size table 1001C, for example, may be maintained in the ROM which is contained in or connected to the CPU 220. Alternatively, if it is sufficient to maintain only the paper information (kinds, size) indicated by the inserted medium pack, the information may be stored in the RAM for which the memory 202 shown in FIG. 12 may be utilized.

Further, the area judgement section 1001D, for example, maintains the area setting data of step SB13 in FIG. 17 and gives an instruction for performing the data processing for the data included in the area. The area judgement section may be made to instruct the data processing for the area in the process of image processing procedure administrated by the CPU 220, subsequent to a setting of the area data to the RAM contained in the CPU 220, a register or the like.

In the foregoing, the date processing is performed in the process of the image processing to the image data on the area of the edge and the predetermined range therealong without the space, thereby reducing the optical density of the area. However, the present invention is not limited to such embodiment. For instance, the present invention may be made to be the following embodiments.

Figure 19:
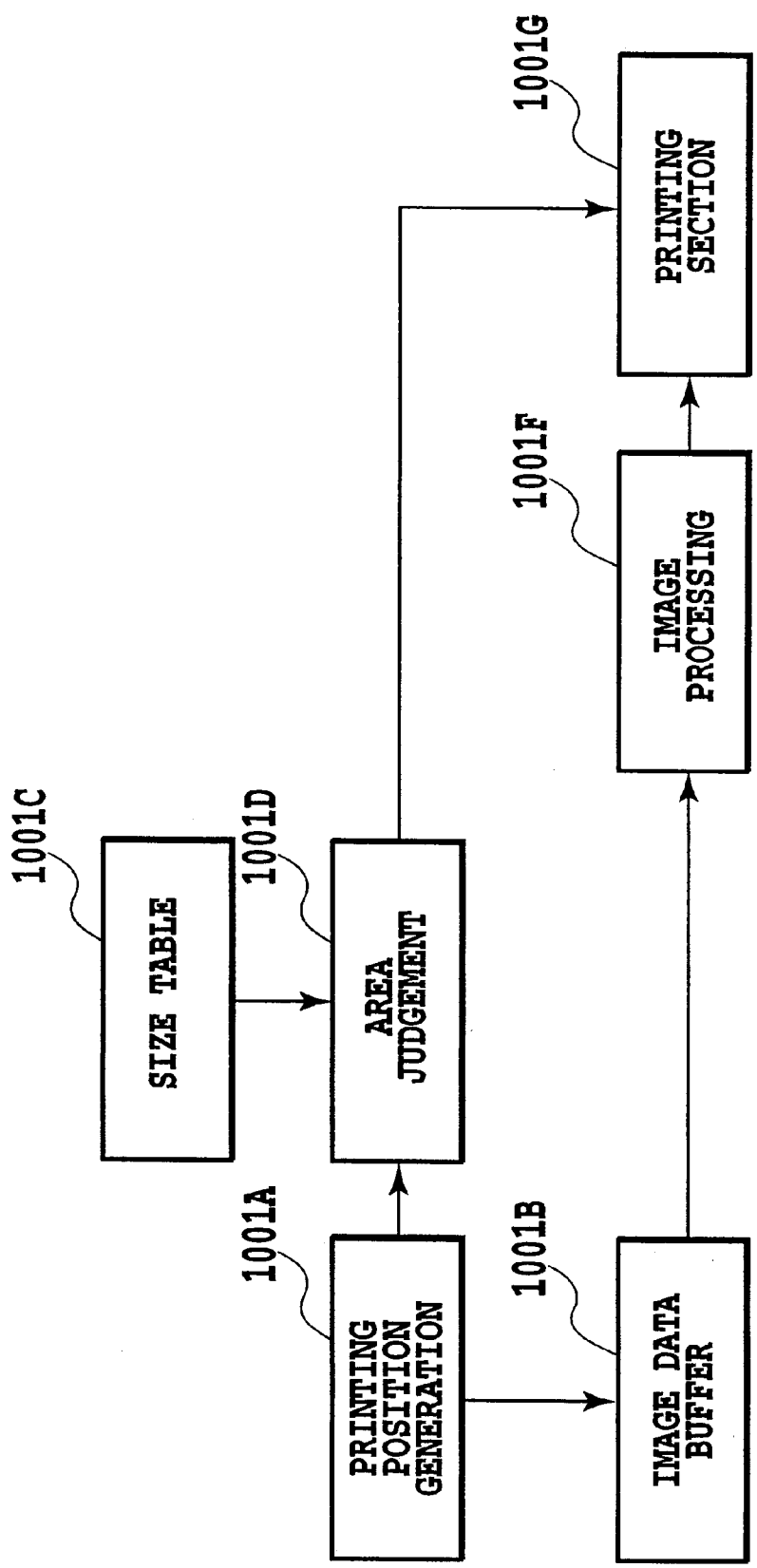
FIG. 19 is a conceptual diagram of a printing processing according to another embodiment of the present invention.

FIG. 19 is a conceptual diagram showing a printing process performed by the printer section B100 according to another embodiment of the present invention.

At first, the printing section 1001G according to the present embodiment is capable of controlling the amount of the printing agent to be applied to the printing medium by the printing element. For instance, this printing section lies in the recording head 207 having a configuration of the ink jet head on which elements such as electrothermal transducers which generate thermal energy used for ejecting inks are arranged and controls a signal energy (a width of driving pulse, i.e., heating period) to be supplied to the element (ejection heater), thereby controlling the ink ejection amount, resulting in being capable of controlling the printing density.

The present embodiment is not provided with the data processing section 1001E employed in the structure in FIG. 18 but is made to have the area judgment data be inputted into the printing section 1001G directly. Further, the present embodiment is made to limit the width of driving pulse relating to the area of the edge and the predetermined range therealong. That is to say, if an area is judged as such area, the ink droplets are controlled to be smaller than usual. Alternatively, in the case that the recoding head is structured so as to be able to eject various size ink droplets, smaller ink droplets may be ejected in order to produce likewise effect. Further, in order to control the width of the ink ejecting amount or to achieve a multi-step controlling, such head structure may be employed that more than two ejection heaters are provided with each one of the ejection openings and driving is performed by appropriately selecting those heaters.

Figure 20:
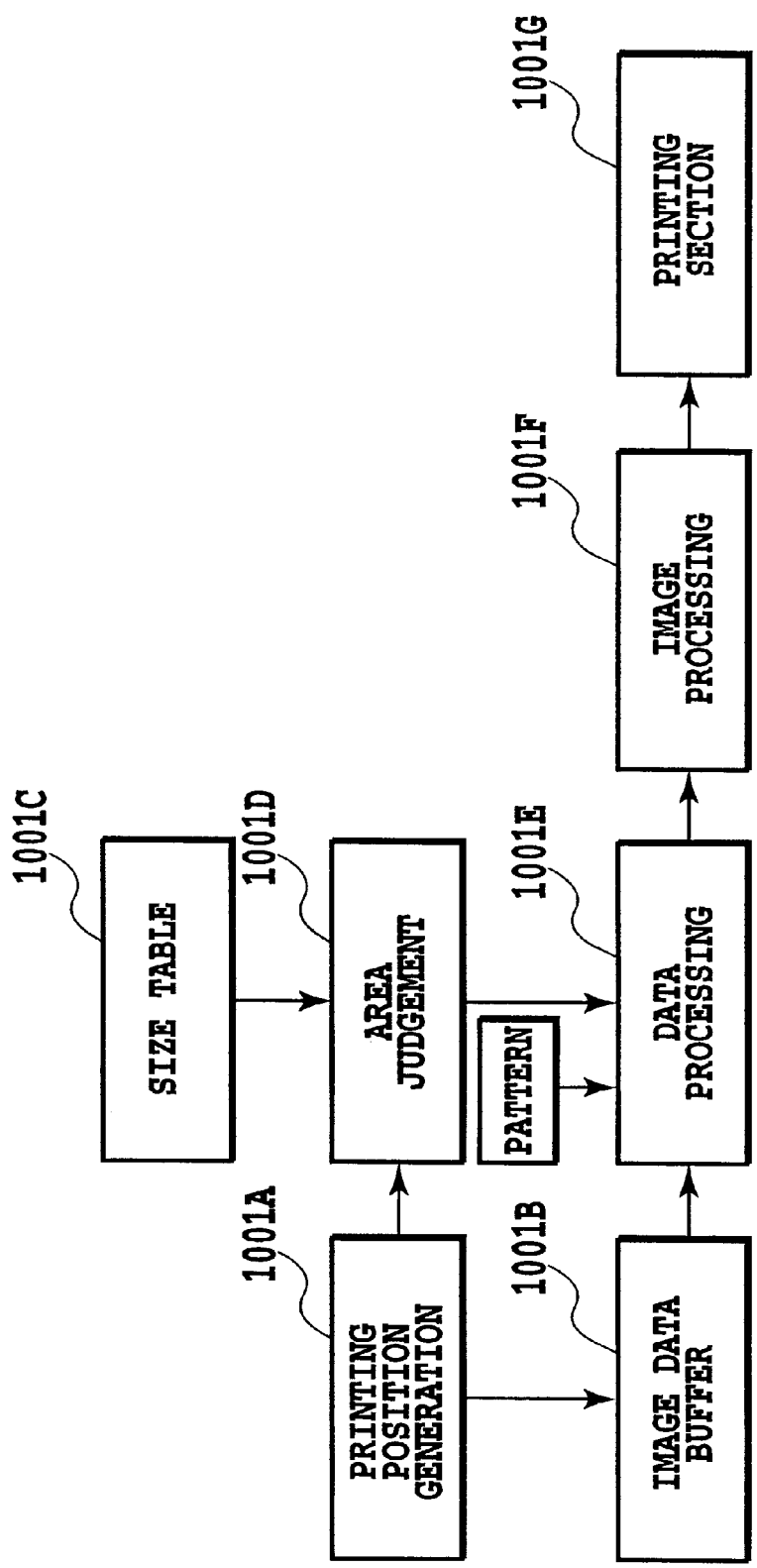
FIG. 20 is a conceptual diagram of a printing processing according to further embodiment of the present invention.

FIG. 20 is a conceptual diagram showing the printing process conducted by the printer section B100 according to another embodiment of the present invention.

The above stated embodiments basically perform the controlling (the processing of the image data or the limiting of ink ejection amount) relating to each of dots in the area, while the present embodiment performs a correction based on an area of a certain range. In other words, a pattern to be printed out within the area is thinned out.

In this regard, a thinning pattern generating section 1003A is prepared to combine thus formed thinning pattern with the image data. For example, if a checkered pattern is provided from the thinning pattern generating section 1003A, the print density is reduced by 50%. Meantime, the pattern may be changed color by color when used in printing.

The data processing section 1001E of the present embodiment may be made to perform the data processing using the thinning pattern at a proper stage in the course of signal processing as shown in FIG. 14 by the image processing section 201 in FIG. 12 as well as the embodiment as indicated in FIG. 17. Alternatively, the data processing section 1001E of the present embodiment may perform the processing in the mask controlling as shown in FIG. 14, providing as the pattern within the mask memory 205 to be used at the time of performing the multi-pass recording. That is, in the mask controlling, it is preferred that the mask pattern to be called out is changed according to a printing position.

Each of the above stated specified embodiments is made to perform the processing for evenly reducing the application amount of the printing agent and the print density relating to the area of the edge and the predetermined range therealong, while also may be made to perform such processing that the printing density as going toward the edge in the area is gradually reduced. For achieving this, for example, a plurality of thresholds are applied on the area to make it possible to control a degree of the density reduction by appropriately using each of the thresholds.

For example, a structure corresponding to that shown in FIG. 18 may be made so as to gradually reduce a coefficient, which is multiplied the data of the area, as going toward the edge portion. A structure corresponding to that shown in FIG. 19 may be made so as to gradually reduce the ink ejection amount of the area as going toward the edge portion. Also, in conjunction with FIG. 20, a change of the patterns according to the degree of the density reduction makes it possible to deal with.

Each of the above described embodiments is made to reduce the application amount of the printing agent according to the size of the printing medium and the image forming mode relating to the area of the edge and the predetermined range therealong, while it also may be made to perform a reducing processing (the image data processing, the driving energy reduction or the thinning pattern adoption) depending on a kind of the processing agent if a favorable image processing differs depending on the kinds of the printing mediums.

In the above-stated specified embodiments, it has been explained that the processing is performed by the printer section B100 when the image data is supplied to the printer section B100, and that it is also possible to create a density controlling data corresponding to the area of the edge and the predetermined range therealong before transferring the image data itself to the printer section B100. In the above-stated embodiments, such processing may be done by the camera section A100 which is one example of the image data supplying apparatus. Further, in the case of achieving such processing by thinning out the image data, it is also possible to create the image data in a form which explained in FIG. 20 to supply thus created data with the printing section B100. The area of the edge and the predetermined range therealong may be made to have a width of one dot line or to have a width of a plurality of dot lines. When it is desired to achieve a minimal application amount of the printing agent beyond the printing medium, it is enough to enlarge the width of the area in order to increase the area to which the application amount of the printing agent is reduced. Conversely, when it is desired to increase an image density near the edge portion, it is sufficient to narrow down the width of the area in order to decrease the area to which the application amount of the printing agent is reduced.

In the case that a sensor for detecting the rear and front edge portions of the printing medium and/or a sensor for detecting the side edge portions of the printing medium are provided with the printing section B100, likewise processing as described above may be performed based on the paper size detected by the sensors, or a correction of the printing position to the edge portion may be made according to the edge portion information read out by the sensors.

Further, in the above embodiments, the present invention has explained in line with the case that the present invention is applied to the printer section integrated with the camera section. It is of course possible to apply the present invention to the printing system such as copying machines, facsimile machines, word processors, computer systems and digital cameras, which have a printer integrally or separately.

Still further, in the above embodiments, the present invention has explained in line with the case that the present invention is applied to an apparatus using the ink jet printing head having the electrothermal transducer. The present invention also may be applied to an apparatus using the ink jet head of a configuration having an electromechanical energy converting element as the printing element. In view of the reducing of the vain consumption of the printing agent which is especially the resource of the printer, the present invention may be also applied to an apparatus using a printing head having a thermal element for heat transfer recording and the like.

As explained above, according to the present invention, when performing the printing without leaving space to at least one portion of the edge portions of the printing medium, the printing agent (the ink) application amount applied beyond a paper is reduced by performing a processing for reducing the application amount of the printing agent relating to the area of the edge and the predetermined range therealong, thereby achieving a downsizing of the content of the material for accepting the printing agent and further contributing to a downsizing of the printing system in the form of the printer and the digital camera and the like using the printer. The present invention also can reduce the consumption of the printing agent as the resource of the printer.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printer for forming an image by using printing means for applying a printing agent to a printing medium, said printer comprising:
   judging means for judging whether printing to an edge portion of the printing medium is to be performed; and
   reducing means for performing a process for reducing an amount of the printing agent to be applied to the edge portion when the judgement is affirmative.

2. A printer as claimed in claim 1, wherein said printing agent application amount reducing means reduces the application amount of the printing agent by performing a processing of image data corresponding to the edge portion.

3. A printer as claimed in claim 1, wherein said printing agent application amount reducing means reduces the application amount of the printing agent by reducing driving signal energy to be applied to the printing means in performing the printing of the edge portion.

4. A printer as claimed in claim 1, wherein said printing agent application amount reducing means reduces the application amount of the printing agent by thinning image data corresponding to the edge portion according to a predetermined mask pattern.

5. A printer as claimed in claim 1, wherein said printing agent application amount reducing means gradually reduces the application amount of the printing agent in a direction toward an edge in the edge portion including the edge and a predetermined range therealong.

6. A printer as claimed in claim 1, wherein said judging means performs the judgement on the basis of information relating to a size of the printing medium to be printed and information of an image forming mode assigned to the printing medium.

7. A printer as claimed in claim 6, wherein said judging means performs the judgement referring to a table correlating information of the size of a plurality of sorts of the printing media and information of image forming modes compatible with the printing media.

8. A printer as claimed in claim 1, wherein an ink jet head, which performs image forming by ejecting ink as the printing agent on the printing medium, is utilized as said printing means.

9. A printer as claimed in claim 8, wherein said ink jet head has a heating element to generate thermal energy for causing film boiling in the ink according to a power distribution, said heating element serving as an element for generating energy used for ejecting the ink.

10. A container for storing printing media to be fed to a printer, said container comprising means for indicating information relating to size of the printing media being stored therein, and wherein said printer comprising:
    means for judging whether printing to an edge portion of a printing medium is to be performed on the basis of the indicated information relating to the size of the printing medium and information of an image forming mode assigned to the printing medium to be printed; and
    means for reducing an amount of printing agent to be applied to the edge portion when the judgement is affirmative.

11. An image data supplying apparatus for supplying image data to a printer which forms an image by using printing means for applying a printing agent to a printing medium, said apparatus comprising:
    judging means for judging whether printing to an edge portion of the printing medium is to be performed;
    reducing means for performing a process for reducing an amount of the printing agent to be applied to the edge portion when the judgement is affirmative; and
    supplying means for supplying the image data, on which the reducing process is performed by said reducing means, to the printer.

12. An image data supplying apparatus as claimed in claim 11, wherein said printing agent application amount reducing means reduces the application amount of the printing agent by performing processing of the image data corresponding to the edge portion.

13. An image data supplying apparatus as claimed in claim 11, wherein said printing agent application amount reducing means reduces the application amount of the printing agent by reducing means reduces the application amount of the printing agent by thinning the image data corresponding to the edge portion according to a predetermined mask pattern.

14. An image data supplying apparatus as claimed in claim 11, wherein said printing agent application amount reducing means gradually reduces the application amount of the printing agent in a direction toward an edge in the edge portion including the edge and a predetermined range therealong.

15. An image data supplying apparatus as claimed in claim 11, wherein said judging means performs the judgement on the basis of information relating to a size of the printing medium to be printed and information of an image forming mode assigned to the printing medium.

16. An image data supplying apparatus as claimed in claim 15, wherein said judging means performs the judgement referring to a table correlating information of the size of a plurality of sorts of printing media and information of image forming modes compatible with the printing media.

17. A printing system comprising:
a printer for forming an image by using printing means for applying a printing agent to a printing medium; and
an image data supplying apparatus for supplying image data to said printer, said apparatus comprising:
judging means for judging whether printing to an edge portion of the printing medium is to be performed;
reducing means for performing a process for reducing an amount of the printing agent to be applied to the edge portion when the judgement is affirmative; and
supplying means for supplying the image data, on which the reducing process is performed by said reducing means, to the printer.

18. A printing system as claimed in claim 17, wherein said printer is integrated with said image data supplying apparatus.

19. A printing system as claimed in claim 17, wherein said image data supplying apparatus comprises a digital camera having means for obtaining the image data by photographing.

20. A printing system as claimed in claim 17, wherein an ink jet head, which performs image forming by ejecting ink as the printing agent on the printing medium, is utilized as said printing means.

21. A printing system as claimed in claim 20, wherein said ink jet head has a heating element to generate thermal energy for causing film boiling in the ink according to a power distribution, said heating element serving as an element for generating energy used for ejecting the ink.

22. A printing method for printing an image by using printing means for applying a printing agent to a printing medium, said method comprising the steps of:
judging whether printing to an edge portion of the printing medium is to be performed; and
performing a process for reducing an amount of the printing agent to be applied to the edge portion when the judgement is affirmative.

23. A printing method as claimed in claim 22, wherein the step of performing a process for reducing the printing agent application amount reduces the application amount of the printing agent by performing a processing of the image data corresponding to the edge portion.

24. A printing method as claimed in claim 22, wherein the step of performing a process for reducing the printing agent application amount reduces the application amount of the printing agent by reducing driving signal energy to be applied to the printing means in performing the printing of the edge portion.

25. A printing method as claimed in claim 22, wherein the step of performing a process for reducing the printing agent application amount reduces the application amount of the printing agent by thinning the image data corresponding to the edge portion according to a predetermined mask pattern.

26. A printing method as claimed in claim 22, wherein the step of performing a process for reducing the printing agent application amount gradually reduces the application amount of the printing agent in a direction toward an edge in the edge portion including the edge and a predetermined range therealong.

27. A printing method as claimed in claim 22, wherein said judging step performs the judgement on the basis of information relating to a size of the printing medium to be printed and information of an image forming mode assigned to the printing medium.

28. A printing method as claimed in claim 27, wherein said judging step performs the judgement referring to a table correlating information of the size of a plurality of sorts of printing media and information of image forming modes compatible with the printing media.

29. A printing method for printing an image by using printing means for applying a printing agent to a printing medium, said method comprising the steps of:
judging whether or not a no-margin printing mode for printing without a margin on a portion of at least one of edges of the printing medium is performed; and
performing a process for reducing an amount of the printing agent to be applied to the edge portion when judged in said judging step that the no-margin printing mode is performed.

30. A printing method for printing an image by using printing means for applying a printing agent to a printing medium, said method comprising the steps of:
judging whether or not a no-margin printing mode for printing without a margin on a portion of at least one of edges of the printing medium is performed;
thinning image data corresponding to the edge portion when judged in said judging step that the no-margin printing mode is performed; and
applying the printing agent by the printing means based on the image data thinned in said thinning step.

31. A printing method for printing an image by using printing means for applying a printing agent to a printing medium, said method comprising the steps of:
selecting one of a no-margin printing mode for printing without a margin on a portion of at least one of edges of the printing medium and a margin printing mode for printing by providing the margin on a portion of edges of the printing medium; and
performing a process for reducing an amount of the printing agent to be applied to the edge portion when the no-margin printing mode is selected in said selecting step.

32. A printing method for printing an image by using printing means for applying a printing agent to a printing medium, said method comprising the steps of:
judging whether or not a no-margin printing without a margin on a predetermined region including a portion of at least one of edges of the printing medium is performed;
performing a process for reducing an amount of the printing agent to be applied to the predetermined region when judged in said judging step that the no-margin printing mode is performed; and
applying the printing agent by the printing means after the process is performed in said reducing process performing step.

33. A printer for printing an image by using printing means for applying a printing agent to a printing medium, comprising:
judging means for judging whether or not a no-margin printing for printing without a margin on a portion of at least one of edges of the printing medium is performed; and
reducing means for performing a process for reducing an amount of the printing agent to be applied to the edge portion when said judging means judges that the no-margin printing is performed.

\* \* \* \* \*

UNITED STATES PATENT AND TRADEMARK OFFICE
CERTIFICATE OF CORRECTION

PATENT NO. : 6,692,097 B2
DATED : February 17, 2004
INVENTOR(S) : Arima et al.

It is certified that error appears in the above-identified patent and that said Letters Patent is hereby corrected as shown below:

Column 6,
Line 12, "3-1 "Printing" should read -- 3-1 "Printing -- and "3-2 "Printing" should read -- 3-2 "Printing --.
Line 13, "3-3 "Ink" should read -- 3-3 "Ink --.

Column 10,
Line 25, "performing an" should read -- performing a --.
Line 29, "and an" should read -- and a --.

Column 12,
Line 4, "connected" should read -- connected with --.
Line 8, "is" should read -- are --.
Line 33, "by an" should read -- by a--.
Line 62, "above mentioned" should read -- above-mentioned --.

Column 13,
Line 28, "includes" should read -- include --.

Column 14,
Line 25, "size" should read -- sizes --.

Column 16,
Line 24, "above described" should read -- above-described --.

Column 17,
Line 11, "electromechanical" should read -- electro-mechanical --.

Column 18,
Line 51, "by reducing means reduces the application" should be deleted.
Line 52, "amount of the printing agent" should be deleted.

UNITED STATES PATENT AND TRADEMARK OFFICE
CERTIFICATE OF CORRECTION

PATENT NO. : 6,692,097 B2
DATED : February 17, 2004
INVENTOR(S) : Arima et al.

It is certified that error appears in the above-identified patent and that said Letters Patent is hereby corrected as shown below:

Column 20,
Line 43, "printing" should read -- printing mode for printing --.
Line 59, "printing for" should read -- printing mode for --.

Signed and Sealed this

Tenth Day of August, 2004

JON W. DUDAS
*Acting Director of the United States Patent and Trademark Office*